US011739912B2

(12) United States Patent
Tsukamoto et al.

(10) Patent No.: US 11,739,912 B2
(45) Date of Patent: Aug. 29, 2023

(54) AIRCRAFT LAMP

(71) Applicant: KOITO MANUFACTURING CO., LTD., Tokyo (JP)

(72) Inventors: Michio Tsukamoto, Shizuoka (JP); Shigeo Sawada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 38 days.

(21) Appl. No.: 17/625,623

(22) PCT Filed: Jul. 9, 2020

(86) PCT No.: PCT/JP2020/026817
§ 371 (c)(1),
(2) Date: Jan. 7, 2022

(87) PCT Pub. No.: WO2021/010271
PCT Pub. Date: Jan. 21, 2021

(65) Prior Publication Data
US 2022/0252242 A1   Aug. 11, 2022

(30) Foreign Application Priority Data

Jul. 12, 2019  (JP) ................................ 2019-130110
Jul. 12, 2019  (JP) ................................ 2019-130111
Jul. 30, 2019  (JP) ................................ 2019-140219

(51) Int. Cl.
*B64D 47/06* (2006.01)
*F21V 23/00* (2015.01)
(Continued)

(52) U.S. Cl.
CPC ............ *F21V 17/002* (2013.01); *B64D 47/06* (2013.01); *F21V 23/004* (2013.01); *F21V 29/70* (2015.01)

(58) Field of Classification Search
CPC .... B64D 47/02; B64D 47/06; B64D 2203/00; F21Y 2107/50; F21W 2107/30; F21V 23/006; F21V 23/009
See application file for complete search history.

(56) References Cited

U.S. PATENT DOCUMENTS

| 6,048,172 A * | 4/2000 | Pniel .................... H05B 47/105 340/946 |
| 10,269,274 B2 | 4/2019 | De Brouwer et al. |

(Continued)

FOREIGN PATENT DOCUMENTS

| EP | 3342717 A1 | 7/2018 |
| JP | S60-141009 U1 | 9/1985 |

(Continued)

OTHER PUBLICATIONS

International Search Report dated Sep. 24, 2020 for WO 2021/010271 A1 (11 pages).

*Primary Examiner* — Alexander K Garlen
(74) *Attorney, Agent, or Firm* — Venjuris, P.C.

(57) ABSTRACT

An aircraft lamp includes: a lamp outer housing configured by a lamp housing having an opening and a cover attached to the lamp housing in a state where the opening is closed, wherein an internal space is formed as an arrangement space; a light source unit arranged in the arrangement space and having a light source; and a control unit including a control substrate that controls an ON/OFF of the light source, and a shielding plate that shields noise generated in the control substrate. The lamp housing is provided with a unit accommodation portion having a concave shape and an insertion/removal port. The control substrate is configured to be accommodated in and removed from the unit accommodation portion via the insertion/removal port. At least a part of the insertion/removal port is closed by the shielding plate (Continued)

in a state where the control substrate is accommodated in the unit accommodation portion.

16 Claims, 11 Drawing Sheets

(51) Int. Cl.
*F21V 17/00* (2006.01)
*F21V 29/70* (2015.01)

(56) References Cited

U.S. PATENT DOCUMENTS

| | | | | |
|---|---|---|---|---|
| 2010/0020557 | A1* | 1/2010 | Mukai | B64D 47/04 362/470 |
| 2012/0327378 | A1* | 12/2012 | Harvey | G09F 21/10 353/119 |
| 2013/0048793 | A1* | 2/2013 | Edmond | B64D 47/02 244/199.4 |
| 2013/0249375 | A1* | 9/2013 | Panagotacos | F21V 5/007 313/15 |
| 2014/0268854 | A1* | 9/2014 | Wilkinson | F21S 43/27 362/267 |
| 2015/0183525 | A1* | 7/2015 | De Jager | F21V 5/08 340/983 |
| 2016/0076722 | A1* | 3/2016 | Hessling von Heimendahl | B64D 47/04 362/470 |
| 2016/0368621 | A1* | 12/2016 | Lueder | B64D 47/06 |
| 2018/0204490 | A1* | 7/2018 | De Brouwer | F21S 45/47 |
| 2018/0334263 | A1* | 11/2018 | Hessling-von Heimendahl et al. | F21S 41/141 |
| 2019/0256223 | A1* | 8/2019 | Depta | B64C 5/02 |
| 2019/0382132 | A1* | 12/2019 | Jha | B64D 47/06 |
| 2020/0047917 | A1* | 2/2020 | Yoda | F21V 29/83 |
| 2022/0106057 | A1* | 4/2022 | Mukai | F21V 23/007 |

FOREIGN PATENT DOCUMENTS

| | | |
|---|---|---|
| JP | H09-282927 A | 10/1997 |
| JP | 2004-172586 A | 6/2004 |
| JP | 2010-033840 A | 2/2010 |
| JP | 2010-033841 A | 2/2010 |
| JP | 2010-272232 A | 12/2010 |
| JP | 2012-003982 A | 1/2012 |
| JP | 2014-032812 A | 2/2014 |
| WO | 2016/165987 A1 | 10/2016 |

* cited by examiner

AIRCRAFT LAMP

CROSS REFERENCE TO RELATED APPLICATIONS

This application is a national phase of PCT application No. PCT/JP2020/026817, filed on 9 Jul. 2020, which claims priority from Japanese patent application Nos. 2019-130110, 2019-130111, and 2019-140219, filed on 12 Jul. 2019, 12 Jul. 2019, and 30 Jul. 2019, respectively, all of which are incorporated herein by reference.

TECHNICAL FIELD

The present disclosure relates to a technical field of an aircraft lamp used in an aircraft and in which a light source is arranged inside a lamp outer housing.

BACKGROUND

There is an aircraft lamp in which a light source (light source unit) is arranged inside a lamp outer housing configured by a cover and a lamp housing (see, e.g., Patent Document 1, Patent Document 2, and Patent Document 3).

There are various types of such aircraft lamps according to usage purposes, and as external lighting, for example, there is a collision prevention light that prevents collision between aircrafts, a flight light that indicates a flight posture or a flight direction of an airframe, a landing light that irradiates a runway during take-off and landing, and a logo lamp that illuminates a logo of an airline company drawn on an airframe.

Patent Document 3 discloses an aircraft lamp that functions as a logo lamp, in which a plurality of lamp units is arranged vertically and horizontally inside a lamp outer housing, and a light source is provided in each lamp unit, respectively.

The logo lamp used as such an aircraft lamp is attached to the horizontal tail wing, and irradiates the vertical tail wing on which a logo is drawn with light.

PRIOR ART DOCUMENT

Patent Document

Patent Document 1: Japanese Laid-Open Patent Publication No. 2010-033840
Patent Document 2: Japanese Laid-Open Patent Publication No. 2010-033841
Patent Document 3: U.S. Ser. No. 10/269,274 B2

SUMMARY OF THE INVENTION

Problem to be Solved

In such an aircraft lamp, it is necessary to suppress the influence of the noise on, for example, each device or each instrument provided in the aircraft, and to secure a good operation state of each device or each instrument.

Further, there is an aircraft lamp in which the ON/OFF of the light source is controlled by a control substrate, and when a problem occurs in the control substrate, there is a concern that a good driving state of the light source may not be secured. Therefore, it is necessary to improve the maintainability of the control substrate.

Therefore, the aircraft lamp according to the disclosure is to secure a good driving state of the light source while improving the maintainability of the control substrate.

Means to Solve the Problem

First, an aircraft lamp according to the present disclosure includes: a lamp outer housing configured by a lamp housing having an opening and a cover attached to the lamp housing in a state where the opening is closed, an internal space being formed in the lamp outer housing as an arrangement space; a light source unit including a light source and arranged in the arrangement space; and a control unit including a control substrate that controls an ON/OFF of the light source, and a shielding plate that shields noise generated in the control substrate. The lamp housing is provided with a unit accommodation portion having a concave shape and an insertion/removal port. The control substrate is configured to be accommodated in and removed from the unit accommodation portion via the insertion/removal port. At least a part of the insertion/removal port is closed by the shielding plate in a state where the control substrate is accommodated in the unit accommodation portion.

Therefore, the control substrate may be accommodated in and removed from the unit accommodation portion provided in the lamp housing, and at least a part of the insertion/removal port of the unit accommodation portion is closed by the shielding plate in a state where the control substrate is accommodated in the unit accommodation portion.

Second, in the aircraft lamp according to the present disclosure, a first light source unit and a second light source unit may be provided as the light source unit, a first control substrate that controls the light source of the first light source unit and a second control substrate that controls the light source of the second light source unit may be provided as the control substrate, and the first control substrate and the second control substrate may be accommodated in and removed from the unit accommodation portion via the insertion/removal port.

Therefore, since both the first control substrate and the second control substrate may be simultaneously accommodated in and removed from the unit accommodating unit, it is not necessary to separately accommodate and remove the first control substrate and the second control substrate in and from the unit accommodation portion.

Third, the aircraft lamp according to the present disclosure, the control unit may be provided with an attaching plate that is configured to be accommodated in the unit accommodation portion and orthogonal to the shielding plate, and the first control substrate and the second control substrate may be attached to both surfaces of the attaching plate.

Therefore, two attaching plate are not needed in order to attach the first control substrate and the second control substrate thereto.

Fourth, in the aircraft lamp according to the present disclosure, the lamp housing may further include a pair of guide grooves configured to guide both end portions of the attaching plate when the first control substrate and the second control substrate are accommodated in the unit accommodation portion.

Therefore, the attaching plate is guided to the guide groove, and the first control substrate and the second control substrate are accommodated in the unit accommodation portion.

Fifth, in the aircraft lamp according to the present disclosure, the attaching plate may be made of a heat-dissipating material, the first control substrate and the second control substrate may be each provided with an electronic component that generates heat during a period of driving, and a heat transfer sheet may be interposed between the electronic component and the attaching plate.

Therefore, heat generated in the first control substrate and the second control substrate is transferred to the attaching plate via the heat transfer sheet.

Sixth, an aircraft lamp according to another aspect of the present disclosure is an aircraft lamp configured to irradiate light to a vertical tail wing of an aircraft, and includes: a lamp outer housing configured by a lamp housing having an opening and a cover attached to the lamp housing in a state where the opening is closed, an internal space being formed in the lamp outer housing as an arrangement space; a first light source unit arranged in the arrangement space and having a first inner lens and a plurality of first light sources; and a second light source unit arranged in the arrangement space and having a second inner lens and a plurality of second light sources. An irradiation direction of light from the first light source unit and an irradiation direction of light from the second light source unit are set to be different from each other. The first inner lens is provided with a plurality of first control lens portions that controls the light emitted from the plurality of first light sources, respectively. The second inner lens is provided with a plurality of second control lens portions that controls the light emitted from the plurality of second light sources, respectively. Each of the plurality of second control lens portions is provided as a first direction control portion or a second direction control portion. An irradiation direction of light emitted from the second light source and controlled by the first direction control portion and an irradiation direction of light emitted from the second light source and controlled by the second direction control portion are set to be different from each other.

Therefore, the irradiation direction of the light from the first light source unit and the irradiation direction of the light from the second light source unit are set to be different from each other, and in the second light source unit, the irradiation directions of the light controlled by the first direction control portion and the light controlled by the second direction control portion are set to be different from each other.

Seventh, in the aircraft lamp according to another aspect of the present disclosure, a refraction angle of light in the first direction control portion may be different from the light in the second direction control portion.

Therefore, the irradiation direction is set to be different by the first direction control portion and the second direction control portion, which have different refraction angles of light.

Eighth, in the aircraft lamp according to another aspect of the present disclosure, the refraction angle of the second direction control portion may be set to be larger than the refraction angle of the first direction control portion, and the second direction control portion may be positioned closer to the cover than at least one of the first direction control portions.

Therefore, since the second direction control portion having a larger refraction angle than the first direction control portion is positioned closer to the cover than the first direction control portion, the light controlled by the second direction control portion is less likely to be shielded by the lamp housing.

Ninth, in the aircraft lamp according to another aspect of the present disclosure, the first inner lens and the second inner lens may be configured to be detachable with respect to the lamp housing.

Therefore, the first inner lens and the second inner lens may be exchanged according to a model of the aircraft.

Tenth, in the aircraft lamp according to another aspect of the present disclosure, the first light source unit may be provided with a substrate on which the first light source is mounted, and the second light source unit may be provided with a substrate on which the second light source is mounted, and the substrate of the first light source may be the same as the substrate of the second light source.

Therefore, the same substrate is provided as the substrate of the first light source unit and the substrate of the second light source unit.

Eleventh, an aircraft lamp according to yet another aspect of the present disclosure includes: a lamp outer housing configured by a lamp housing having an opening and a cover attached to the lamp housing in a state where the opening is closed, an internal space being formed in the lamp outer housing as an arrangement space; and a plurality of lamp units arranged in the arrangement space. Each of the lamp units is provided with a plurality of semiconductor light emitting elements that functions as light sources, and a control lens that controls light emitted from the semiconductor light emitting elements. The plurality of semiconductor light emitting elements of the lamp unit are controllable to be individually turned ON/OPP.

Therefore, each lamp unit is provided with a plurality of semiconductor light emitting elements, and the ON/OFF of the plurality of semiconductor light emitting elements is individually performed.

Twelfth, in the aircraft lamp according to yet another aspect of the present disclosure, a vertical tail wing may be illuminated by light irradiated from the plurality of lamp units, and at least two lamp units of the plurality of lamp units may be arranged at different positions in a left-right direction. When, among the lamp units arranged at the different positions in the left-right direction, a lamp unit arranged at a position close to the vertical tail wing may be set to a near lamp unit, and a lamp unit arranged at a position farther from the vertical tail wing than the near lamp unit is set to a distant lamp unit, an upper side area of the vertical tail wing may be illuminated by light irradiated from the near lamp unit, and a lower side area of the vertical tail wing may be illuminated by light irradiated from the distant lamp unit.

Therefore, the light irradiated toward the lower side area is less likely to be shielded by the lamp housing.

Thirteenth, in the aircraft lamp according to yet another aspect of the present disclosure, two distant lamp units may be arranged, and light from the two distant lamp units may be irradiated to intersect with each other.

Therefore, the irradiated light is less likely to be shielded by the lamp housing, and the degree of freedom in the illumination direction is increased.

Fourteenth, in the aircraft lamp according to yet another aspect of the present disclosure, the distant lamp unit may be arranged closer to the cover than the near lamp unit in an attaching direction of the cover with respect to the lamp housing.

Therefore, the light irradiated toward the lower side area is less likely to be shielded by the lamp housing.

Fifteenth, in the aircraft lamp according to yet another aspect of the present disclosure, irradiation directions of light from at least two lamp units of the plurality of lamp units may be different from each other.

Therefore, light is irradiated in different directions from at least two lamp units of the plurality of lamp units arranged in the arrangement space.

Sixteenth, in the aircraft lamp according to yet another aspect of the present disclosure, a light source module including the plurality of semiconductor light emitting elements and a substrate on which the plurality of semiconductor light emitting elements are mounted may be arranged inside the lamp unit, and at least two lamp units may have different arrangement states of the plurality of semiconductor light emitting elements with respect to the substrate.

Therefore, it is possible to change the irradiated area or the irradiation range of light for each lamp unit having a different arrangement of the semiconductor light emitting elements.

Seventeenth, in the aircraft lamp according to yet another aspect of the present disclosure, the light source module may be provided with a reflector including a plurality of reflecting portions that individually reflects light respectively emitted from the plurality of semiconductor light emitting elements toward the control lens.

Therefore, since light is reflected by the plurality of reflecting portions and directed to the control lens, the light emitted from the semiconductor light emitting element is easily incident on the control lens.

Effect of the Invention

According to the present disclosure, since the control substrate is able to be accommodated in and removed from the unit accommodation portion provided in the lamp housing, and at least a part of the insertion/removal port of the unit accommodation portion is closed by the shielding plate in a state where the control substrate is accommodated in the unit accommodation portion, the control substrate is easily exchanged, and noise generated in the control substrate is shielded by the shielding plate. Therefore, it is possible to secure, for example, a good operation state of each device or each instrument provided in the aircraft while improving the maintainability of the control substrate.

DETAILED DESCRIPTION TO EXECUTE THE INVENTION

Hereinafter, an embodiment for implementing an aircraft lamp of the present disclosure will be described with reference to the accompanying drawings.

In the aircraft lamp, a light source is arranged inside a lamp outer housing, and the lamp outer housing is configured by a lamp housing and a cover. In the following descriptions, front-rear, upward-downward, and left-right directions are illustrated by setting a coupling direction of the lamp housing and the cover to a vertical direction, the cover as an upper side, and the lamp housing as a lower side. Further, the aircraft lamp is attached to an upper surface side of the horizontal tail wing, and with respect to the left-right direction, the vertical tail wing side is represented as the inner side in the left-right direction, and the tip side of the horizontal tail wing is represented as the outer side.

Further, the front-rear, upward-downward, and left-right directions illustrated in the following are for convenience of explanation, and the implementation of the present disclosure is not limited to these directions.

In the following, an example in which the aircraft lamp of the present disclosure is applied to a logo lamp that is an external lighting is illustrated. However, the scope of application of the present disclosure is not limited to the logo lamp, but may be applied to other external lighting used in an aircraft.

[Aircraft Lamp According to First Embodiment]

First, an aircraft lamp 1 according to a first embodiment will be described.

Figure 1:
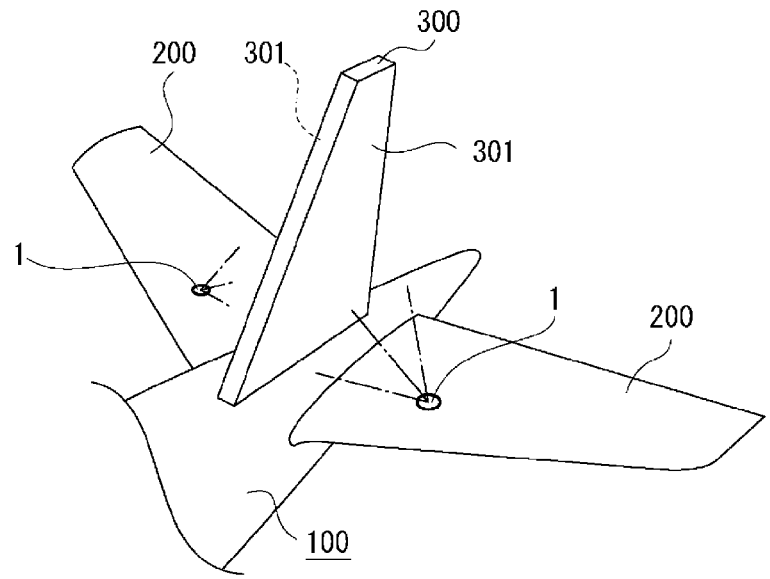
FIG. 1 illustrates an embodiment of an aircraft lamp of the present disclosure together with FIGS. 2 to 9, and is a perspective view illustrating a part of an aircraft.

The aircraft lamp 1 is used, for example, as a logo lamp that is an external lighting, is attached to an airframe of an aircraft 100, for example, both horizontal tail wings 200 and 200 on the rear side, and has a function of illuminating a logo (not illustrated) drawn on a vertical tail wing 300 (see FIG. 1). Therefore, light emitted from the aircraft lamp 1 at one side is irradiated to one surface of the left and right surfaces of the vertical tail wing 300, and light emitted from the aircraft lamp 1 at the other side is irradiated to the other surface of the left and right surfaces of the vertical tail wing 300. The left and right surfaces of the vertical tail wing 300 become irradiated surfaces 301 and 301, respectively. An arrangement recess (not illustrated) opened upward is formed at the horizontal tail wing 200.

Figure 2:
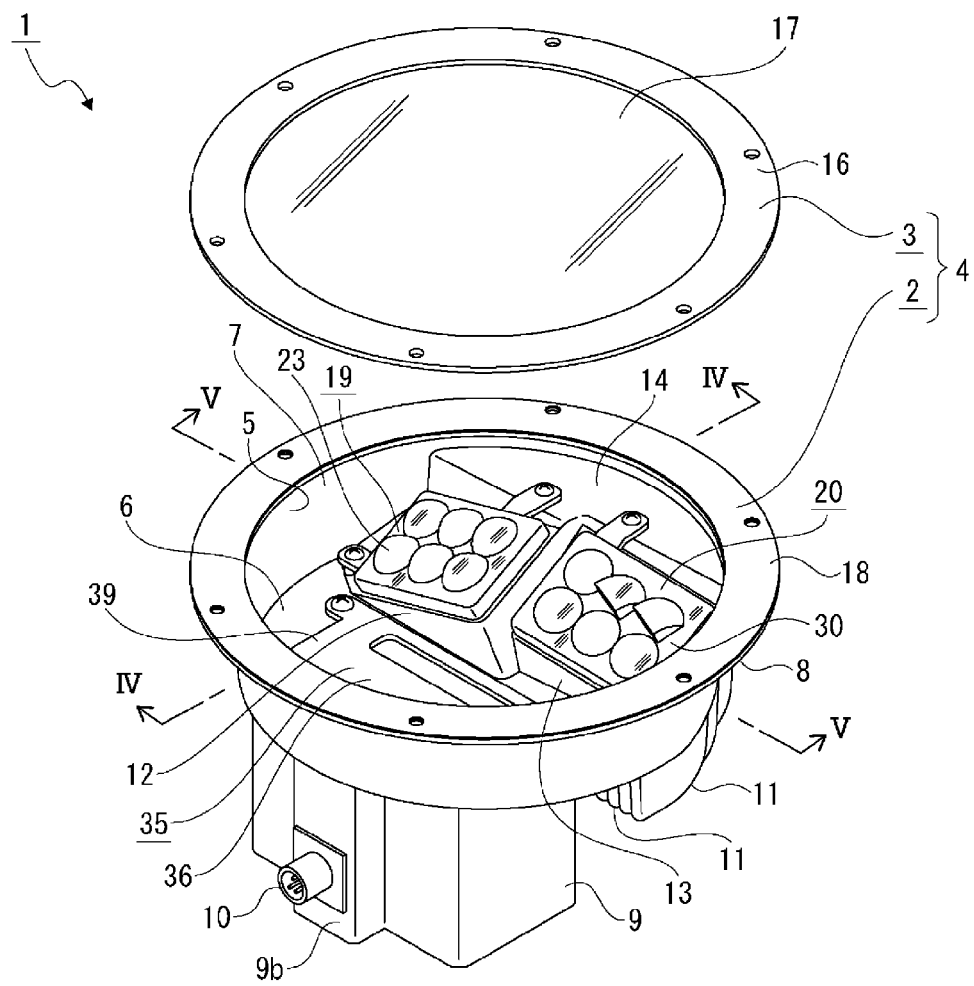
FIG. 2 is a perspective view illustrating the aircraft lamp in which a cover is separated.
Figure 3:
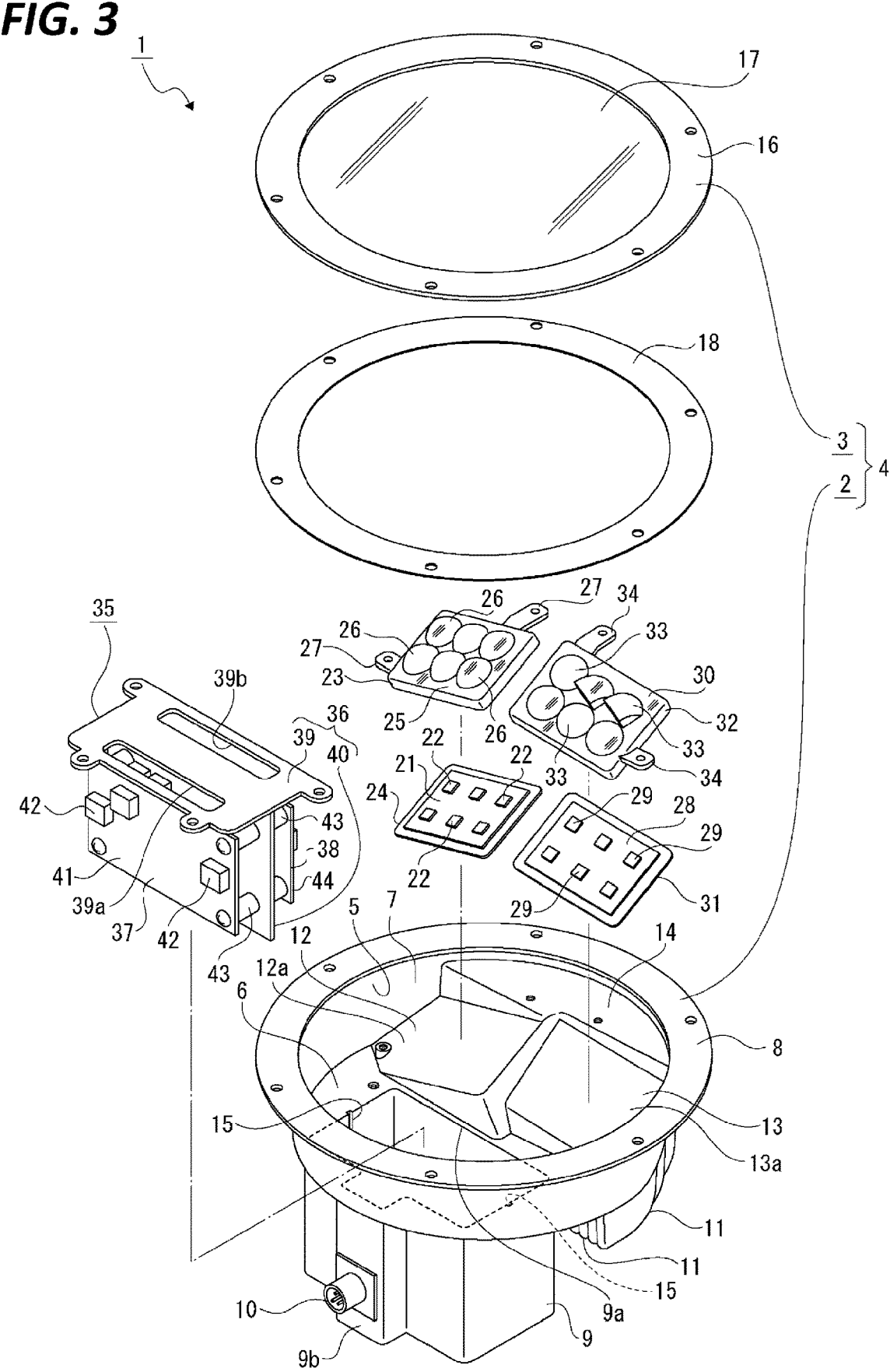
FIG. 3 is an exploded perspective view of the aircraft lamp.

The aircraft lamp 1 includes a lamp housing 2 having an opening at the upper end and a cover 3 attached to the lamp housing 2 in a state where the opening of the lamp housing 2 is closed (see FIGS. 2 and 3). A lamp outer housing 4 is configured by the lamp housing 2 and the cover 3, and an internal space of the lamp outer housing 4 is formed as an arrangement space 5.

Each part of the lamp housing 2 is integrally formed of, for example, a metal material such as aluminum. The lamp housing 2 includes a bottom surface portion 6 facing the vertical direction, a peripheral surface portion 7 protruding upward from the outer peripheral portion of the bottom surface portion 6, and an annular-shaped flange portion 8 protruding outward from the upper end portion of the peripheral surface portion 7 (see FIGS. 2 to 5).

The lamp housing 2 is provided with a unit accommodation portion 9 protruding downward from the bottom surface portion 6. The unit accommodation portion 9 is formed in a box shape that protrudes downward from the inner side portion of the bottom surface portion 6 in the left-right direction, and is opened upward. The opening at the upper end of the unit accommodation portion 9 is formed as an insertion/removal opening 9a.

The unit accommodation portion 9 is provided with a connector attaching portion 9b protruding inner side in the left-right direction. The connector attaching portion 9b is provided in the central portion of the unit accommodation portion 9 in the front-rear direction. A connector 10 is attached to the connector attaching portion 9b with a penetrated state. The connector 10 has a portion positioned on the outer surface side of the connector attaching portion 9b and a portion positioned on the inner surface side of the connector attaching portion 9b, and the portion positioned on the outer surface side of the connector attaching portion 9b is connected to a power supply circuit (not illustrated) of the aircraft 100 via a connection cord (not illustrated).

The lamp housing 2 is provided with heat radiation fins 11, 11, . . . protruding downward from the bottom surface portion 6. The heat radiation fins 11, 11, . . . are provided to protrude downward from the outer side portion of the bottom surface portion 6 in the left-right direction, and to be arranged in the front-rear direction.

The lamp housing 2 is provided with a first arrangement portion 12 and a second arrangement portion 13 protruding upward from the bottom surface portion 6, respectively, and the first arrangement portion 12 and the second arrangement portion 13 are arranged in the front-rear direction and protrude upward from the outer portion from the unit accommodation portion 9 in the left-right direction of the bottom surface portion 6. The upper surfaces of the first arrangement portion 12 and the second arrangement portion 13 are provided as an inclined portion 12a and an inclined portion 13a, respectively. The inclined portion 12a is positioned on the rear side of the inclined portion 13a.

Both the inclined portion 12a and the inclined portion 13a are inclined to be displaced downward as they go to the outer side in the left-right direction, and the inclined portion 12a is inclined forward, the inclined portion 13a is inclined backward. An inclination angle of the inclined portion 13a in the left-right direction is larger than an inclination angle of the inclined portion 12a in the left-right direction.

The lamp housing 2 is provided with a pedestal portion 14 protruding upward from the bottom surface portion 6, and the pedestal portion 14 protrudes upward from the outer portions of the first arrangement portion 12 and the second arrangement portion 13 in the left-right direction of the bottom surface portion 6. An upper surface of the pedestal portion 14 is positioned above the inclined portions 12a and 13a.

In the lamp housing 2, the unit accommodation portion 9 includes guide grooves 15 and 15 at both the front and rear end portions, respectively. The guide grooves 15 and 15 are opened in opposite directions in the front-rear direction and opened upward.

The cover 3 includes a retainer 16 formed in an annular shape by a metal material such as aluminum, and a transmission cover portion 17 with an outer peripheral portion fixed to the retainer 16 (see FIGS. 2 and 3). The cover 3 is coupled to the flange portion 8 of the lamp housing 2 by, for example, screwing via a gasket 18 having substantially the same size and shape as the retainer 16. The gasket 18 is made of, for example, a silicon material, and has a function of securing airtightness between the lamp housing 2 and the cover 3.

The aircraft lamp 1 is arranged in the arrangement recess formed in the horizontal tail wing 200 by fixing the retainer 16 and the flange portion 8 to the horizontal tail wing 200 by, for example, screwing, in a state where the cover 3 is coupled to the flange portion 8.

A first light source unit 19 and a second light source unit 20 are detachable with respect to the lamp housing 2, respectively (see FIG. 3). The first light source unit 19 is attached to the first arrangement portion 12, and the second light source unit 20 is attached to the second arrangement portion 13 (see FIGS. 2 to 5).

The first light source unit 19 includes a substrate 21 on which a circuit pattern is formed, first light sources 22, 22, . . . mounted on the substrate 21, and a first inner lens 23 that controls light emitted from the first light sources 22, 22, . . . (see FIG. 3).

The substrate 21 is arranged on the inclined portion 12a of the first arrangement portion 12 via a heat radiation sheet 24.

For example, a light emitting diode (LED) is used as the first light source 22. The first light sources 22, 22, . . . are regularly mounted on one surface of the substrate 21. For example, the first light sources 22 are mounted by three in the front-rear direction and by two in the left-right direction, so that a total of six first light sources 22 are mounted thereon.

Figure 6:
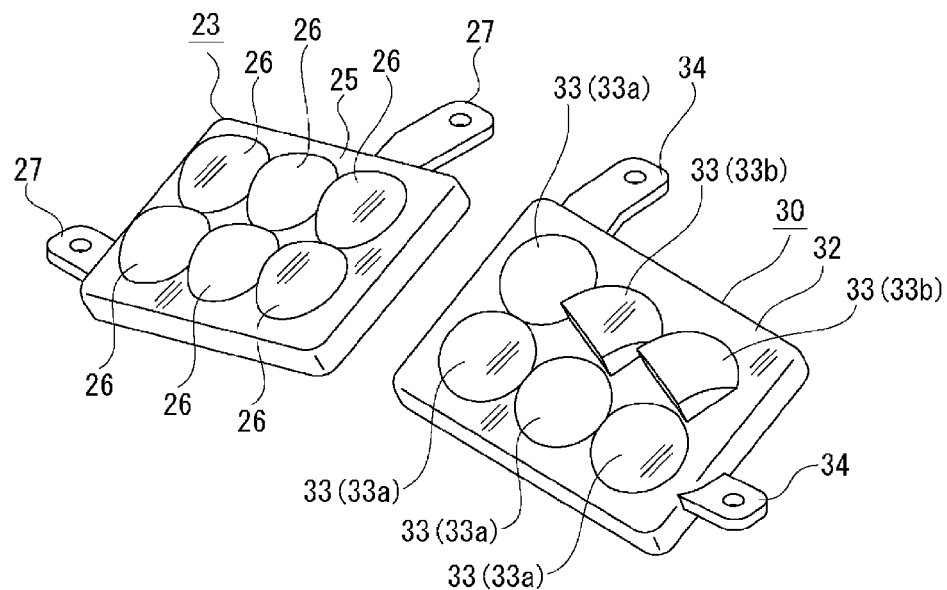
FIG. 6 is an enlarged perspective view of an inner lens.

The first inner lens 23 is made of transparent resin or glass, and includes a base surface portion 25 having a flat-plate shape, first control lens portions 26, 26, . . . having a substantially hemispherical shape protruding upward from the base surface portion 25, respectively, and leg portions 27 and 27 protruding from the outer peripheral portion of the base surface portion 25 (see FIG. 6). The first control lens portions 26, 26, . . . are provided at positions corresponding to the first light sources 22, 22, . . . in the same number as the first light sources 22, 22, . . . (see FIG. 3). The first control lens portions 26, 26, . . . are, for example, convex lenses having a free curved surface, and have a function of controlling to condense light emitted from the first light sources 22, 22, . . . and irradiating the light, respectively.

The first inner lens 23 is arranged on the inclined portion 12a in a state where the base surface portion 25 and the first control lens portions 26, 26, . . . cover the substrate 21 and the first light sources 22, 22, . . . from above, and is attached to the lamp housing 2 by coupling the leg portions 27 and 27 to the first arrangement portion 12 and the pedestal portion 14 by, for example, screwing, respectively. Therefore, the substrate 21, the first light sources 22, 22, . . . , and the first inner lens 23 are arranged in the arrangement space 5.

The second light source unit 20 includes a substrate 28 on which a circuit pattern is formed, second light sources 29, 29, . . . mounted on the substrate 28, and a second inner lens 30 that controls light emitted from the second light sources 29, 29, . . . .

The substrate 28 is arranged on the inclined portion 13a of the second arrangement portion 13 via a heat radiation sheet 31. The same substrate as the substrate 21 of the first light source unit 19 is used as the substrate 28.

In this manner, since the same substrate is used as the substrate 21 on which the first light sources 22, 22, . . . are mounted and as the substrate 28 on which the second light sources 29, 29, . . . are mounted, the same substrate is provided as the substrate 21 of the first light source unit 19 and as the substrate 28 of the second light source unit 20, so that the manufacturing cost of the aircraft lamp 1 may be reduced.

For example, a light emitting diode is used as the second light source 29. The second light sources 29, 29, . . . are regularly mounted on one surface of the substrate 28. For example, the second light sources 29 are mounted by three in the front-rear direction and by two in the left-right direction, so that a total of six second light sources 29 are mounted thereon.

The second inner lens 30 is made of transparent resin or glass, and includes a base surface portion 32 having a flat-plate shape, second control lens portions 33, 33, . . . protruding upward from the base surface portion 32, respectively, and leg portions 34 and 34 protruding from the outer peripheral portion of the base surface portion 32 (see FIG. 6). The second control lens portions 33, 33, . . . are provided at positions corresponding to the second light sources 29, 29, . . . in the same number as the second light sources 29, 29, . . . (see FIG. 3).

The second control lens portion 33 is provided as a first direction control portion 33a or a second direction control portion 33b. For example, three second control lens portions 33, 33, and 33 positioned on the inner side in the left-right direction, and the second control lens portion 33 positioned on the outer side in the left-right direction and positioned on the rearmost side are provided as the first direction control portions 33a, 33a, . . . , two second control lens portions 33 and 33 positioned on the outer side in the left-right direction and positioned on the front side are provided as the second direction control portions 33b and 33b.

The second control lens portions 33, 33, . . . have a function of controlling to condense light emitted from the second light sources 29, 29, . . . and irradiating the light, respectively. The first direction control portions 33a, 33a, . . . are, for example, convex lenses formed in a substantially hemispherical shape having a free curved surface, and the second direction control portions 33b and 33b are, for example, prism lenses. Refraction angles of light in the first direction control portion 33a and the second direction control portion 33b are different from each other, and the refraction angle of the second direction control portion 33b is set to be larger than the refraction angle of the first direction control portion 33a.

The second inner lens 30 is arranged on the inclined portion 13a in a state where the base surface portion 32 and the second control lens portions 33, 33, . . . cover the substrate 28 and the second light sources 29, 29, . . . from above, and is attached to the lamp housing 2 by coupling the leg portions 34 and 34 to the second arrangement portion 13 and the pedestal portion 14 by, for example, screwing, respectively. Therefore, the substrate 28, the second light sources 29, 29, . . . , and the second inner lens 30 are arranged in the arrangement space 5.

Figure 4:
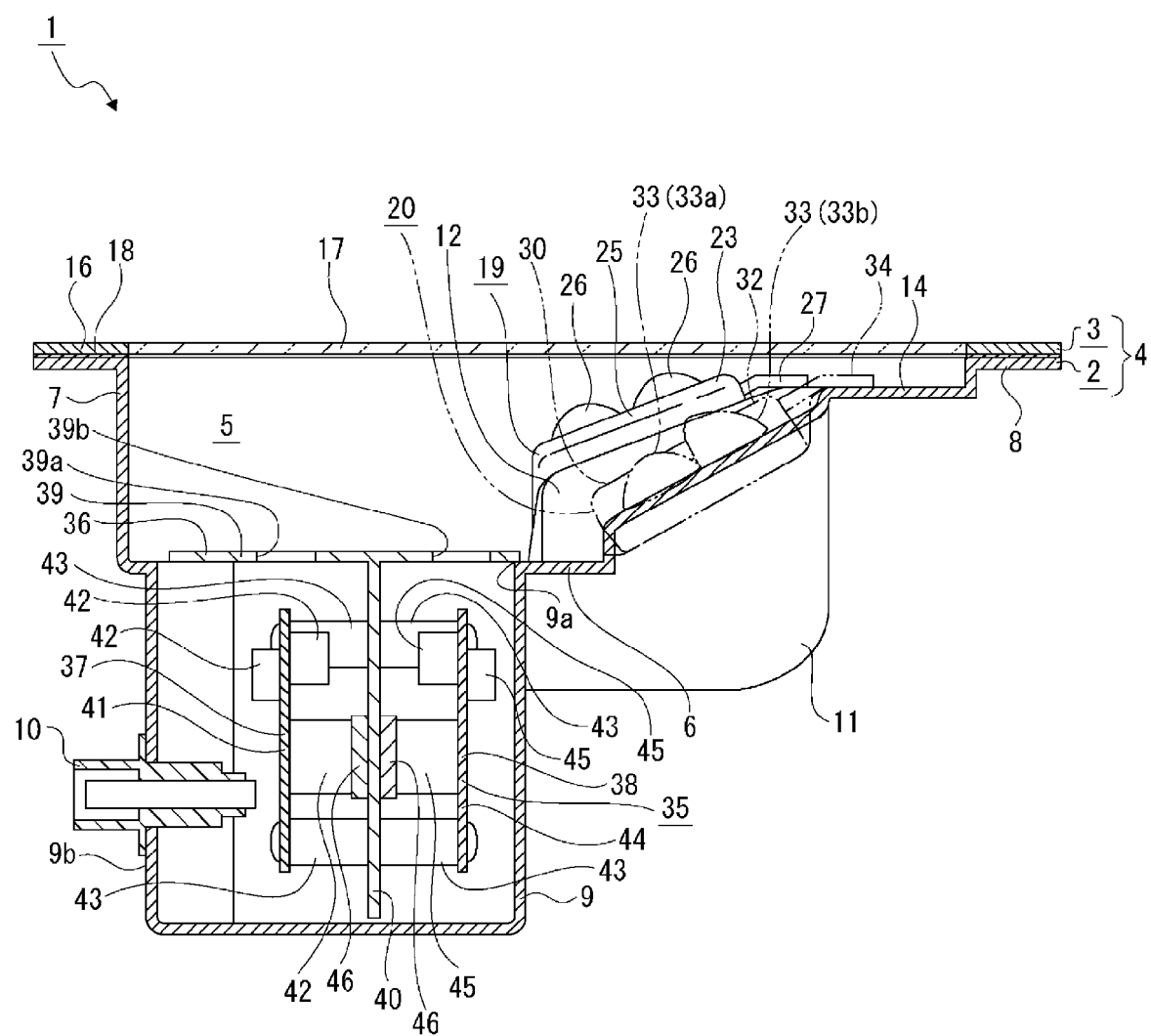
FIG. 4 is a cross-sectional view taken along line IV-IV in FIG. 2.
Figure 5:
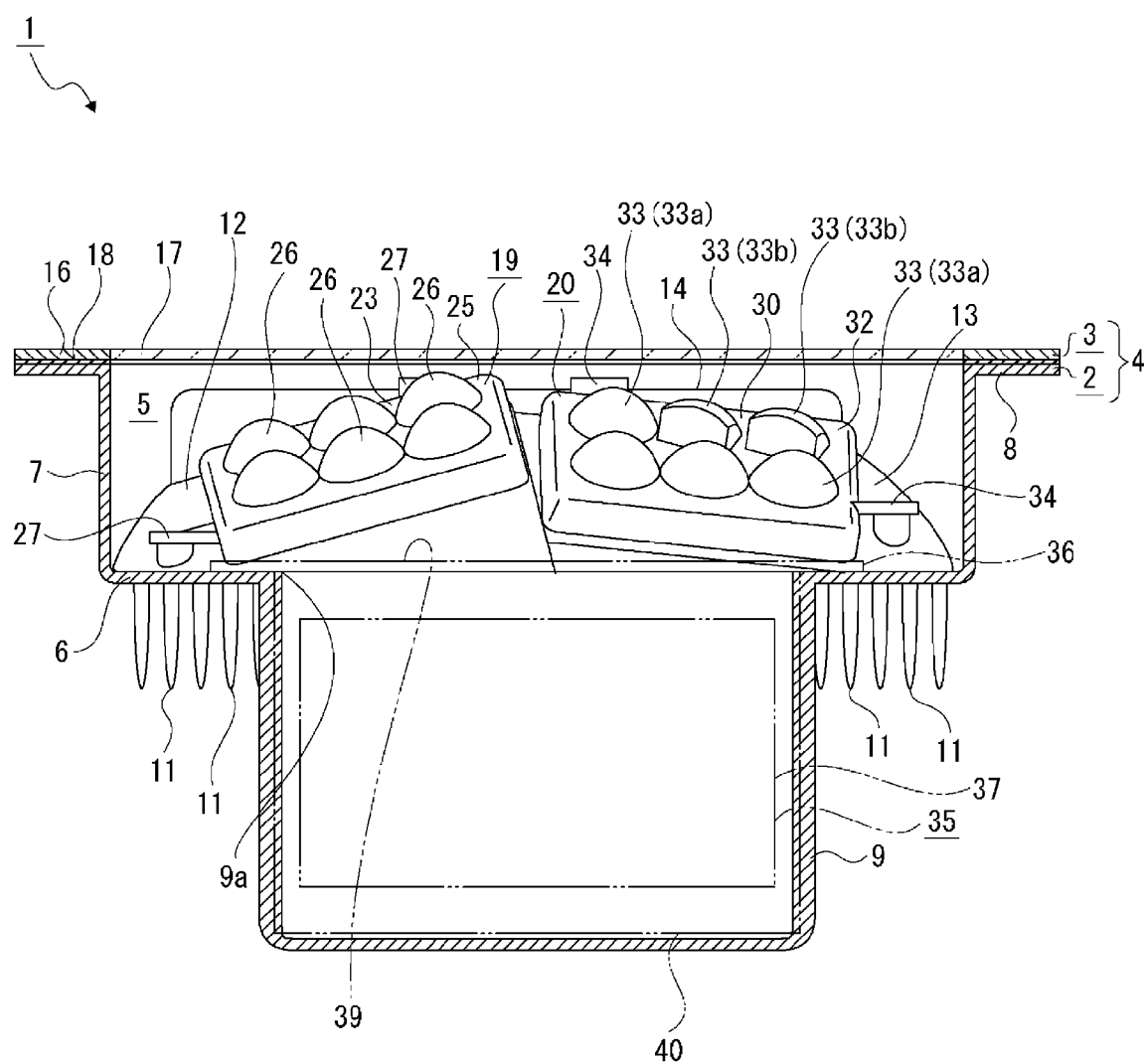
FIG. 5 is a cross-sectional view taken along line V-V in FIG. 2.

Since, in the state where the second inner lens 30 is arranged in the arrangement space 5, the inclined portion 13a is inclined to be displaced upward as it goes to the outer side in the left-right direction, the second direction control portions 33b and 33b are positioned closer to the cover 3 than the three first direction control portions 33a, 33a, and 33a positioned on the inner side in the left-right direction (see FIGS. 4 and 5).

As described above, since the first light source unit 19 is arranged on the inclined portion 12a, the second light source unit 20 is arranged on the inclined portion 13a, and the inclination angles of the inclined portion 12a and the inclined portion 13a are different from each other, the irradiation direction of the light from the first light source unit 19 and the irradiation direction of the light from the second light source unit 20 are set to be different from each other.

As described above, since the leg portions 27 and 27 or the leg portions 34 and 34 are attached to the lamp housing 2 by, for example, screwing, the first inner lens 23 and the second inner lens 30 are detachable with respect to the lamp housing 2.

Therefore, the first inner lens 23 and the second inner lens 30 may be exchanged according to a model of the aircraft 100. Therefore, by attaching the first inner lens 23 and the second inner lens 30 according to the different model aircraft 100 to the lamp housing 2, it is possible to widely irradiate light on the irradiated surface 301 of the vertical tail wing 300 of the different model aircraft 100, and the versatility of the aircraft lamp 1 may be improved.

A control unit 35 is detachable with respect to the lamp housing 2 (see FIG. 3). The control unit 35 includes, for example, a bracket 36 made of a metal material such as aluminum, and a first control substrate 37 and a second control substrate 38 attached to the bracket 36, respectively.

The bracket 36 is configured by a shielding plate 39 facing vertically and having a flat-plate shape, and an attaching plate 40 protruding downward from the center portion of the shielding plate 39 in the left-right direction, and the attaching plate 40 is formed in a flat-plate shape facing the left-right direction. The shielding plate 39 includes insertion holes 39a and 39b separated from each other in the left-right direction.

The first control substrate 37 has a function of controlling the ON/OFF of the first light sources 22, 22, . . . of the first light source unit 19, and includes a base substrate 41 facing the left-right direction, and electronic parts 42, 42, . . . mounted on both the left and right surfaces of the base substrate 41. The first control substrate 37 is attached to the attaching plate 40 via spacers 43, 43, . . . by, for example, screwing.

The second control substrate 38 has a function of controlling the ON/OFF of the second light sources 29, 29, . . . of the second light source unit 20, and includes a base substrate 44 facing the left-right direction, and electronic parts 45, 45, . . . mounted on both the left and right surfaces of the base substrate 44. The second control substrate 38 is attached to the attaching plate 40 via spacers 43, 43, . . . by, for example, screwing.

The first control substrate 37 and the second control substrate 38 are positioned on the opposite side in the left-right direction across the attaching plate 40. Therefore, the first control substrate 37 is positioned below the insertion hole 39a formed in the shielding plate 39, and the second control substrate 38 is positioned below the insertion hole 39b formed in the shielding plate 39.

Figure 7:
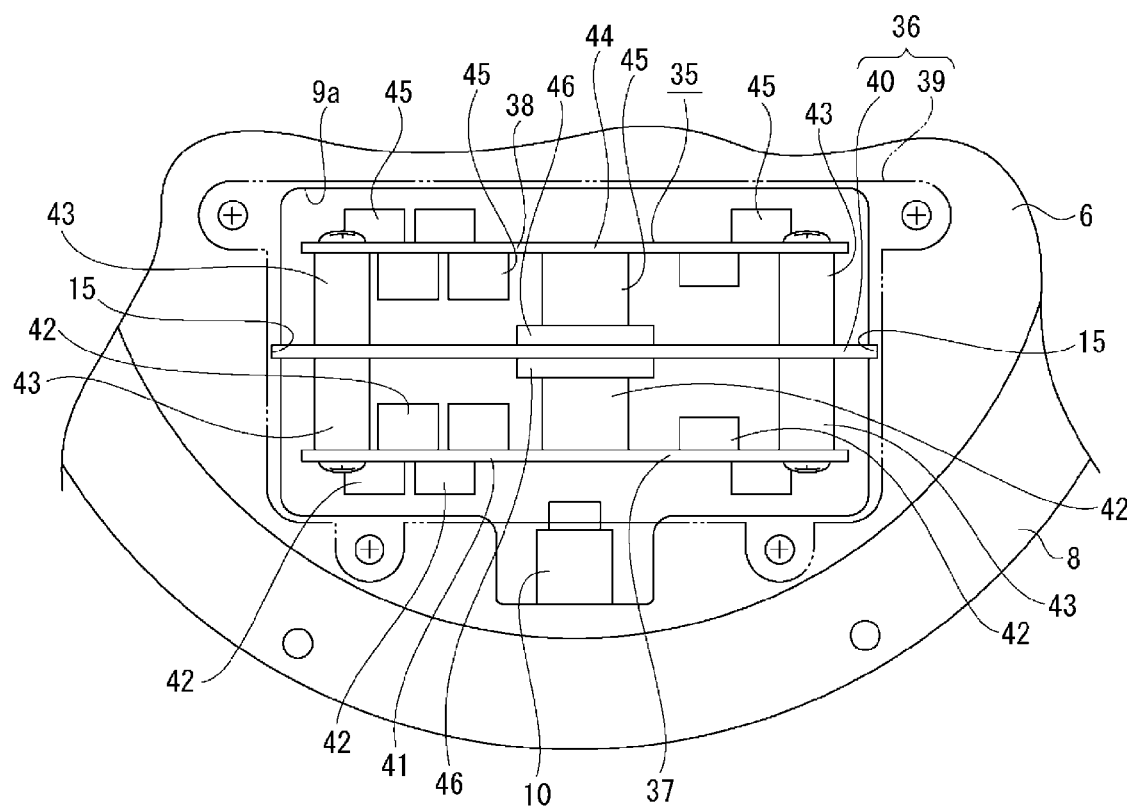
FIG. 7 is a plan view illustrating a state where a shielding plate of a control unit is attached to a lamp housing.

A heat transfer sheet 46 is interposed between at least one electronic part 42 of the first control substrate 37 and the attaching plate 40, and a heat transfer sheet 46 is interposed between at least one electronic part 45 of the second control substrate 38 and the attaching plate 40 (see FIG. 7). Therefore, the heat generated in the first control substrate 37 and the second control substrate 38 is transferred from the heat transfer sheets 46 and 46 to the attaching plate 40, and the heat transferred to the attaching plate 40 is transferred to the lamp housing 2 and released to the outside. Further, the heat generated in the first control substrate 37 and the second control substrate 38 and transferred to the attaching plate 40 is also transferred from the attaching plate 40 to the shielding plate 39, and also released from the shielding plate 39 to the arrangement space 5.

In this manner, since the heat generated in the first control substrate 37 and the second control substrate 38 is transferred to the attaching plate 40 by the heat transfer sheets 46 and 46, the temperature rise of the first control substrate 37 and the second control substrate 38 is suppressed, and a good driving state of the first control substrate 37 and the second control substrate 38 may be secured.

Further, the heat transfer sheet 46 may be interposed between the electronic parts 42 and 45 having the largest heat generation amount and the attaching plate 40. Further, the heat transfer sheet 46 may be interposed between a plurality of electronic parts 42, 42, . . . and the attaching plate 40, and the heat transfer sheet 46 may be interposed between a plurality of electronic parts 45, 45, . . . and the attaching plate 40.

Further, since both the first control substrate 37 and the second control substrate 38 are attached to the attaching plate 40, two attaching plates for attaching the first control substrate 37 and the second control substrate 38 are not required, and thus, the number of parts may be reduced and the control unit 35 may be miniaturized.

In the control unit 35 configured as described above, the attaching plate 40, the first control substrate 37, and the second control substrate 38 may be accommodated in and removed from the unit accommodation portion 9 via the insertion/removal port 9a. In the control unit 35, the shielding plate 39 is attached to the bottom surface portion 6 by, for example, screwing in a state where the attaching plate 40, the first control substrate 37, and the second control substrate 38 are accommodated in the unit accommodation portion 9, and the portion of the insertion/removal port 9a except for a portion is closed by the shielding plate 39 (see FIG. 7).

When the attaching plate 40, the first control substrate 37, and the second control substrate 38 are accommodated in the unit accommodation portion 9, both the front and rear end portions of the attaching plate 40 are guided to the guide grooves 15 and 15 of the unit accommodation portion 9, respectively.

In this manner, since the attaching plate 40 is guided to the guide grooves 15 and 15, and the first control substrate 37 and the second control substrate 38 are accommodated in the unit accommodation portion 9, the first control substrate 37 and the second control substrate 38 may be easily accommodated in the unit accommodation portion 9, and the first control substrate 37 and the second control substrate 38 are avoided from being brought into contact with the lamp housing 2, and thus, it is possible to prevent the first control substrate 37 and the second control substrate 38 from being damaged.

As described above, in the state where the shielding plate 39 is attached to the bottom surface portion 6, the first control substrate 37 and the second control substrate 38 are covered from directions except above by each of the surface portions of the unit accommodation portion 9 and is covered from above by the shielding plate 39.

In this manner, the first control substrate 37 and the second control substrate 38 are accommodated inside the unit accommodation portion 9, and covered by the unit accommodation portion 9 and the shielding plate 39, and thus, the noise generated in the the first control substrate 37 and the second control substrate 38 is shielded by the unit accommodation portion 9 and the shielding plate 39.

As described above, in the state where the first light source unit 19, the second light source unit 20, and the control unit 35 are attached to the lamp housing 2, the substrate 21 of the first light source unit 19 and the first control substrate 37 are connected by a first connecting cable (not illustrated) inserted to the insertion hole 39a of the shielding plate 39, and the substrate 28 of the second light source unit 20 and the second control substrate 38 are connected by a second connecting cable (not illustrated) inserted to the insertion hole 39b of the shielding plate 39. Further, the first control substrate 37 and the portion positioned on the inner surface side of the connector attaching portion 9b of the connector 10 are connected by a first connector cable (not illustrated), and the second control substrate 38 and the portion positioned on the inner surface side of the connector attaching portion 9b of the connector 10 are connected by a second connector cable (not illustrated).

Therefore, a current is supplied from a power supply circuit to the first light sources 22, 22, . . . mounted on the substrate 21 via the connector 10 and the first control substrate 37, and a current is supplied from the power supply circuit to the second light sources 29, 29, . . . mounted on the substrate 28 via the connector 10 and the second control substrate 38.

In the aircraft lamp 1, a current is supplied, for example, simultaneously from the power supply circuit to the first light sources 22, 22, . . . and the second light sources 29, 29, . . . .

Figure 8:
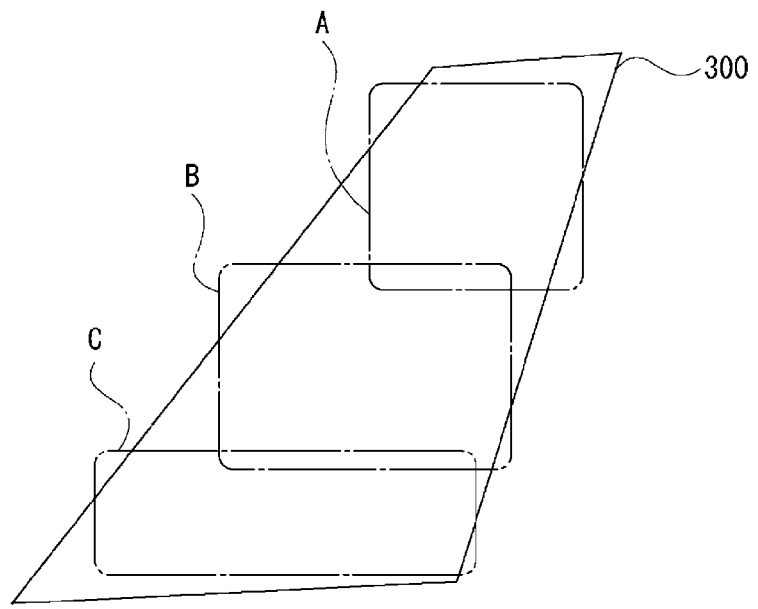
FIG. 8 is a conceptual view illustrating an irradiation state of light on a vertical tail wing.

When the current is supplied to the first light sources 22, 22, . . . , light is emitted from the first light sources 22, 22, . . . , and the emitted light is controlled by the first control lens portions 26, 26, . . . of the first inner lens 23, respectively, and is irradiated to an upper end side area A of the irradiated surface 301 of the vertical tail wing 300 (see FIG. 8).

Figure 9:
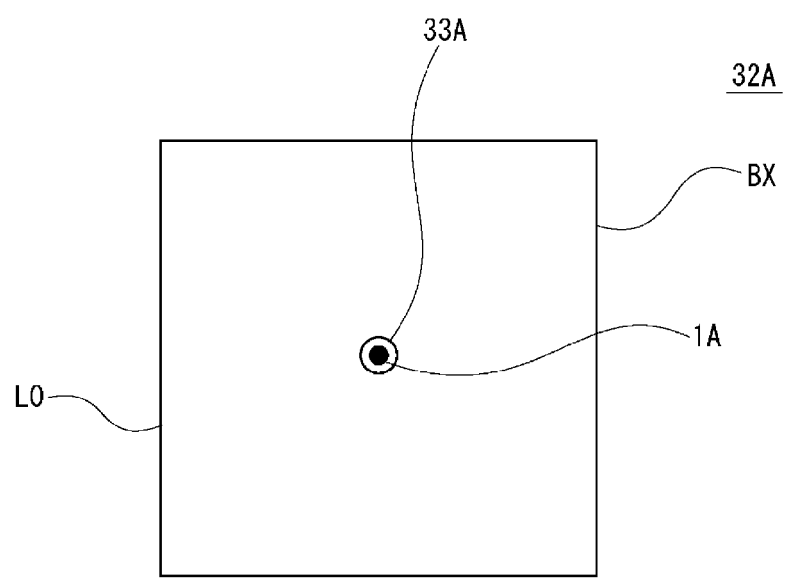
FIG. 9 is a conceptual view illustrating a path of light controlled by a control lens of a second inner lens.

Meanwhile, when the current is supplied to the second light sources 29, 29, . . . , light is emitted from the second light sources 29, 29, . . . , and the emitted light is controlled by the second control lens portions 33, 33, . . . of the second inner lens 30, respectively (see FIG. 9). At this time, the light incident on the first direction control portions 33a, 33a, . . . is controlled by the first direction control portions 33a, 33a, . . . , so as to be irradiated toward the vertical tail wing 300 as light P to a central area B of the irradiated surface 301 in the vertical direction (see FIG. 8). Further, the light incident on the second direction control portions 33b and 33b is controlled by the second direction control portions 33b and 33b so as to be greatly refracted and be irradiated toward the vertical tail wing 300 as light Q (see FIG. 9) to a lower end side area C of the irradiated surface 301 (see FIG. 8).

In this manner, in the aircraft lamp 1, the light controlled by the first control lens portions 26, 26, . . . of the first inner lens 23 is irradiated to the upper end side area A of the irradiated surface 301 of the vertical tail wing 300, the light controlled by the first direction control portions 33a, 33a, . . . of the second inner lens 30 is irradiated to the central area B of the irradiated surface 301 of the vertical tail wing 300 in the vertical direction, and the light controlled by the second direction control portions 33b and 33b of the second inner lens 30 is irradiated to the lower end side area C of the irradiated surface 301 of the vertical tail wing 300. Therefore, the irradiated surface 301 of the vertical tail wing 300 on which a logo is drawn is entirely illuminated by the light emitted from the first light sources 22, 22, . . . and the second light sources 29, 29, . . . .

As disclosed above, in the aircraft lamp 1, the lamp housing 2 is provided with the concave unit accommodation portion 9 having the insertion/removal port 9a, the first control substrate 37 and the second control substrate 38 may be accommodated in and removed from the unit accommodation portion 9 via the insertion/removal port 9a, and in the state where the first control substrate 37 and the second control substrate 38 are accommodated in the unit accommodation portion 9, at least a part of the insertion/removal port 9a is closed by the shielding plate 39.

Therefore, the first control substrate 37 and the second control substrate 38 may be accommodated in and removed from the unit accommodation portion 9 provided in the lamp housing 2, and in the state where the first control substrate 37 and the second control substrate 38 are accommodated in the unit accommodation portion 9, at least a part of the insertion/removal port 9a of the unit accommodation portion 9 is closed by the shielding plate 39. Therefore, the first control substrate 37 and the second control substrate 38 are easily exchanged, and the noise generated in the first control substrate 37 and the second control substrate 38 is shielded by the shielding plate 39, so that the maintainability of the first control substrate 37 and the second control substrate 38 are improved, and then, it is possible to secure a good operation state of, for example, each device or each instrument provided in the aircraft 100.

Further, by connecting each part by the cable inside the lamp housing 2, power may be supplied from the power supply circuit to the first light sources 22, 22, . . . and the second light sources 29, 29, . . . , and in the state where the first control substrate 37 and the second control substrate 38 are accommodated in the unit accommodation portion 9, the entire insertion/removal port 9a may be closed by the shielding plate 39.

With such a configuration, it is possible to improve the shielding effect by the shielding plate 39 on the noise generated in the first control substrate 37 and the second control substrate 38.

Further, the first light source unit 19 and the second light source unit 20 are provided, the first control substrate 37 that controls the first light sources 22, 22, . . . of the first light source unit 19 and the second control substrate 38 that controls the second light sources 29, 29, . . . of the second light source unit 20 are provided, and both the first control substrate 37 and the second control substrate 38 may be accommodated in and removed from the unit accommodation portion 9 via the insertion/removal port 9a.

Therefore, the first control substrate 37 and the second control substrate 38 may be simultaneously accommodated in and removed from the unit accommodation portion 9. Therefore, it is not necessary to separately accommodate and take out the first control substrate 37 and the second control substrate 38 in/from the unit accommodation portion 9, so that, while further improving the maintainability of the first control substrate 37 and the second control substrate 38, it is possible to secure a good operation state of, for example, each device or each instrument provided in the aircraft 100.

However, since a logo drawn on the vertical tail wing 300 of the aircraft 100 differs in the position on which the logo is drawn or the size depending on the airline, it is desired that the logo lamp that illuminates the logo enables a wide range of irradiation so that efficient lighting is performed regardless of the position on which the logo is drawn or the size.

Further, it is desired for the structure that performs such efficient lighting to have a simple structure.

Therefore, in the aircraft lamp 1, the irradiation direction of the light from the first light source unit 19 and the irradiation direction of the light from the second light source unit 20 are set to be different from each other, and the second control lens portions 33, 33, . . . are provided as the first direction control portions 33a, 33a, . . . or the second direction control portions 33b and 33b, so that the irradiation direction of the light emitted from the second light sources 29, 29, . . . and controlled by the first direction control portions 33a, 33a, . . . and the irradiation direction of the light emitted from the second light sources 29 and 29 and controlled by the second direction control portions 33b and 33b are set to be different from each other.

Therefore, the irradiation direction of the light from the first light source unit 19 and the irradiation direction of the light from the second light source unit 20 are set to be different from each other, and in the second light source unit 20, the irradiation directions of the light controlled by the first direction control portions 33a, 33a, . . . and the light controlled by the second direction control portions 33b and 33b are set to be different from each other. Therefore, light is irradiated in three different directions from the aircraft lamp 1, and thus, it is possible to secure a widely irradiated state with respect to the vertical tail wing 300 while ensuring the simplification of the structure.

Further, since the refraction angles of the light in the first direction control portions 33a, 33a, . . . and the second direction control portions 33b and 33b are different from each other, the irradiation directions of the light are set to be different from each other by the first direction control portions 33a, 33a, . . . and the second direction control portions 33b and 33b, which have different refraction angles of light.

Therefore, it is possible to irradiate light in different directions with a simple configuration, and the vertical tail wing 300 may be widely irradiated with light without causing an increase in the manufacturing cost of the aircraft lamp 1.

Additionally, the refraction angle of the second direction control portion 33b and 33b is larger than the refraction angle of the first direction control portions 33a, 33a, . . . , and thus, the second direction control portions 33b and 33b are positioned closer to the cover 3 than at least one of the first direction control portions 33a, 33a, . . . .

Therefore, since the second direction control portions 33b and 33b having the refraction angle larger than that of the first direction control portions 33a, 33a, . . . are positioned closer to the cover 3 than the first direction control portions 33a, 33a, . . . , the light controlled and irradiated by the second direction control portions 33b and 33b is less likely to be shielded by the lamp housing 2, and the lower end side of the irradiated surface 301 of the vertical tail wing 300 may be efficiently irradiated by the second direction control portions 33b and 33b.

Further, in the above, the example in which six first control lens portions 26 and six second control lens portions 33 are provided in the first inner lens 23 and the second inner lens 30, respectively, has been described, but the number of the first control lens portions 26 and the second control lens portions 33 is not limited to six, and is arbitrary. Further, when a plurality of first control lens portions 26 and a plurality of second control lens portions 33 are provided, the arrangement state may also be set arbitrarily.

Further, in the above, the example in which four first direction control portions 33a and two second direction control portions 33b are provided in the second inner lens 30 has been described, but the number of the first direction control portions 33a and the second direction control portions 33b may be set arbitrarily depending on the irradiation direction or the irradiation range of light.

Further, in the above, the example in which the first direction control portion 33a and the second direction control portion 33b are provided in the second inner lens 30 has been described, but conversely, the first direction control portion and the second direction control portion may be provided in the first inner lens 23, and the first direction control portion and the second direction control portion may be provided in both the first inner lens 23 and the second inner lens 30, respectively.

Further, in the above, the example in which light is irradiated in three different directions from the aircraft lamp 1 has been described, but it is possible to secure a wide irradiation state with respect to the vertical tail wing 300 with a configuration in which light is irradiated in four or more different directions from the aircraft lamp 1.

[Aircraft Lamp According to Second Embodiment]

Subsequently, an aircraft lamp 51 according to a second embodiment will be described.

Figure 10:
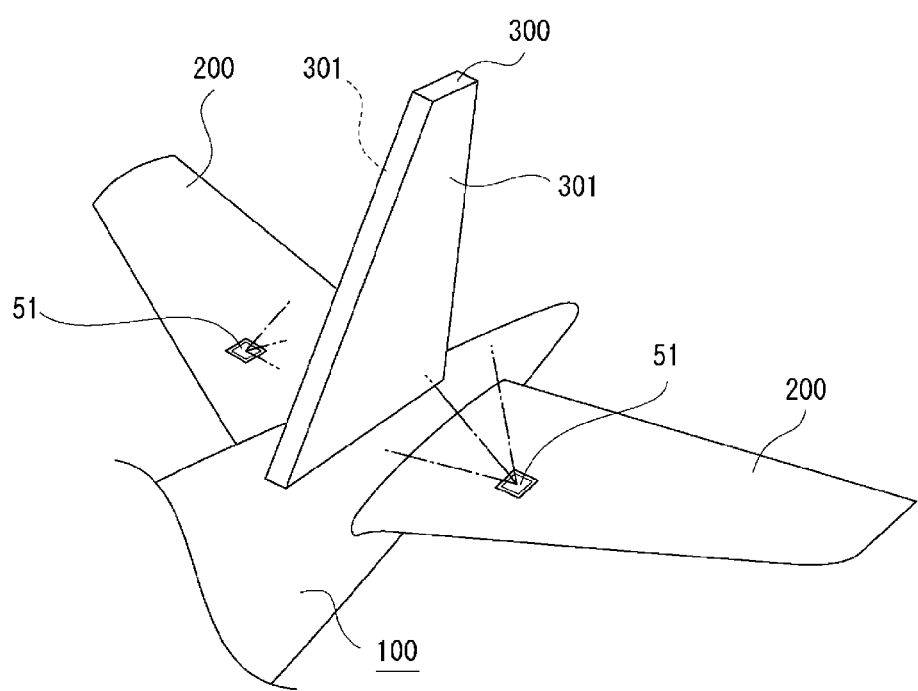
FIG. 10 illustrates an embodiment of an aircraft lamp of the present disclosure together with FIGS. 11 to 16, and is a perspective view illustrating a part of an aircraft.

The aircraft lamp 51 is used, for example, as a logo lamp that is an external lighting, is attached to an airframe of an aircraft 100, for example, both horizontal tail wings 200 and 200 on the rear side, and has a function of illuminating a logo (not illustrated) drawn on a vertical tail wing 300 (see FIG. 10). Therefore, light emitted from the aircraft lamp 51 at one side is irradiated to one surface of the left and right surfaces of the vertical tail wing 300, and light emitted from the aircraft lamp 51 at the other side is irradiated to the other surface of the left and right surfaces of the vertical tail wing 300. The left and right surfaces of the vertical tail wing 300 become irradiated surfaces 301 and 301, respectively. An arrangement recess (not illustrated) opened upward is formed at the horizontal tail wing 200.

Figure 11:
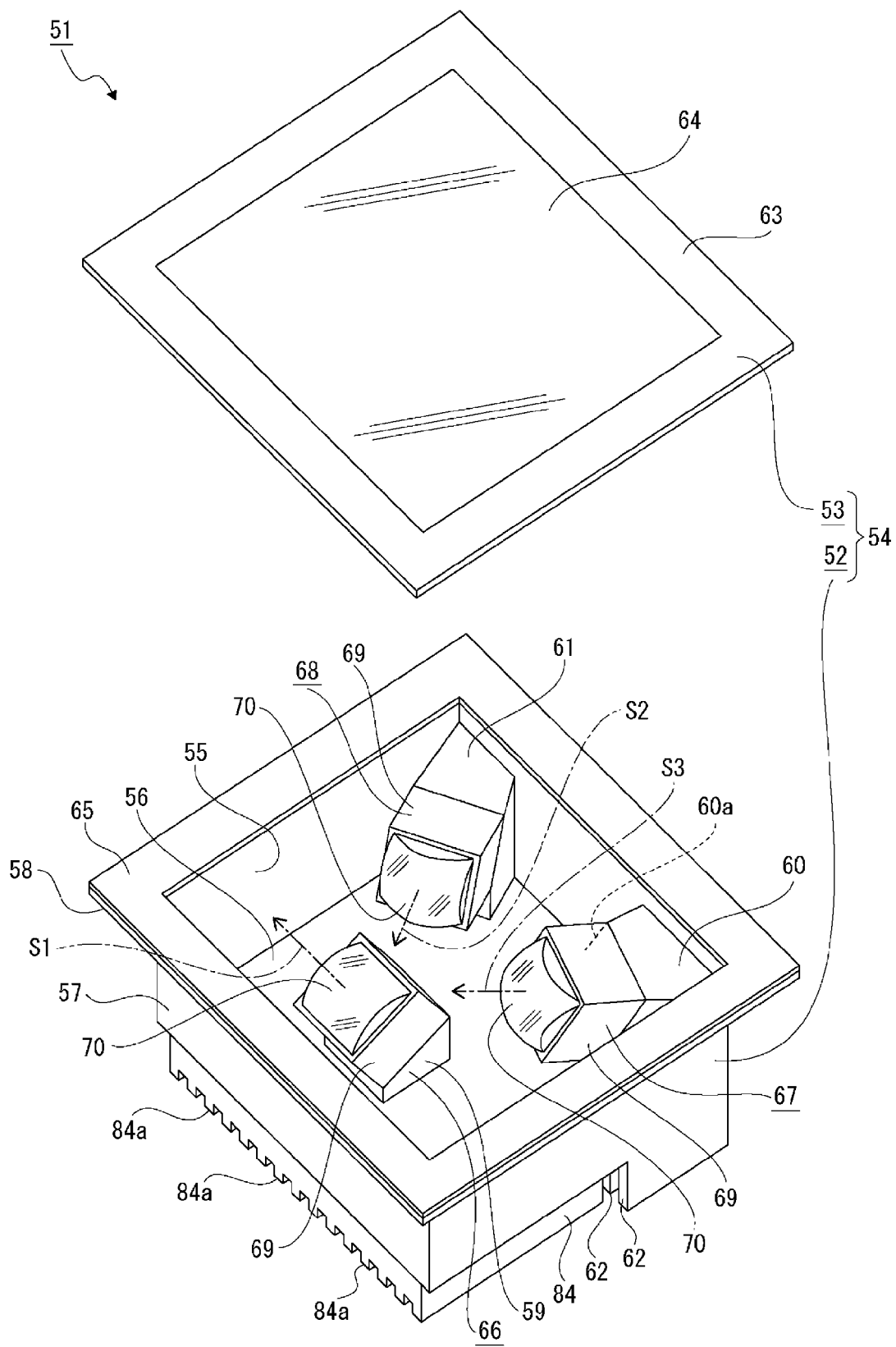
FIG. 11 is a perspective view illustrating the aircraft lamp in which a cover is separated.
Figure 12:
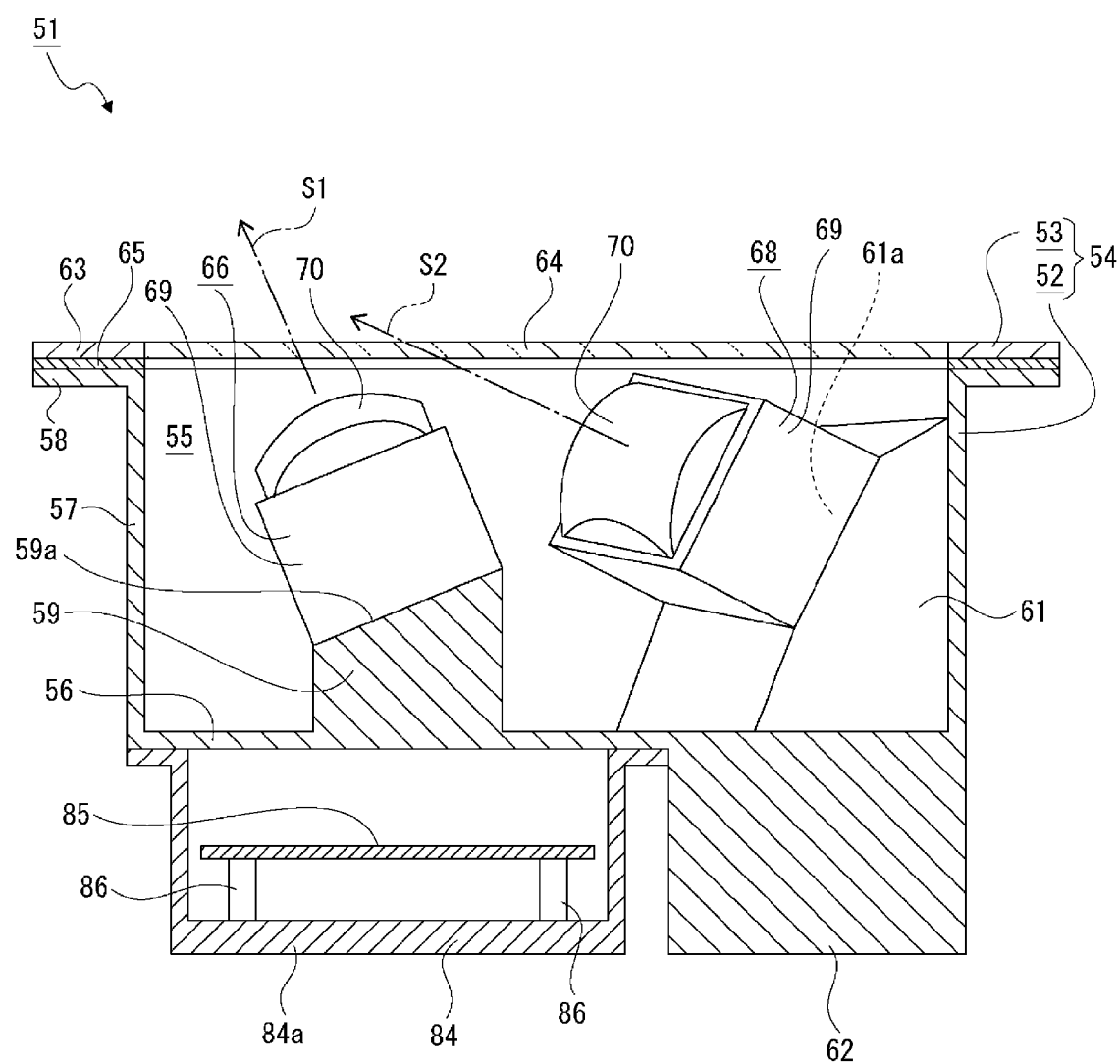
FIG. 12 is a cross-sectional view of the aircraft lamp.

The aircraft lamp 51 includes a lamp housing 52 having an opening at the upper end and a cover 53 attached to the lamp housing 52 in a state where the opening of the lamp housing 52 is closed (see FIGS. 11 and 12). A lamp outer housing 54 is configured by the lamp housing 52 and the cover 53, and an internal space of the lamp outer housing 54 is formed as an arrangement space 55.

Each part of the lamp housing 52 is integrally formed of, for example, a metal material such as aluminum. The lamp housing 52 includes a bottom surface portion 56 facing the vertical direction, a peripheral surface portion 57 protruding upward from the outer peripheral portion of the bottom surface portion 56, and an annular-shaped flange portion 58 protruding outward from the upper end portion of the peripheral surface portion 57.

The bottom surface portion 56 is formed in, for example, a rectangular shape, the peripheral surface portion 57 is formed in, for example, a polygonal cylindrical shape, and the flange portion 58 is formed in, for example, a rectangular frame shape.

The lamp housing 52 is provided with a first attaching base portion 59 protruding upward from the bottom surface portion 56. The first attaching base portion 59 protrudes from the inner side portion in the left-right direction, and is positioned at a substantially central portion in the front-rear direction.

The lamp housing 52 is provided with a second attaching base portion 60 and a third attaching base portion 61 protruding obliquely upward from the positions reaching the bottom surface portion 56 and the peripheral surface portion 57, respectively, to be separated in the front-rear direction. The second attaching base portion 60 and the third attaching base portion 61 are positioned outer side in the left-right direction from the first attaching base portion 59, and is positioned forward and rearward of the first attaching base portion 59.

In each of the first attaching base portion 59, the second attaching base portion 60, and the third attaching base portion 61, end surfaces 59a, 60a, and 61a in the protruding direction are formed in a plane, and the end surfaces 59a, 60a, and 61a are inclined upward and downward in the left-right direction with respect to the bottom surface portion 56. The end surface 60a and the end surface 61a are inclined upward and downward in the front-rear direction as well. The end surface 59a of the first attaching base portion 59 has an inclination angle larger than that of the end surface 60a of the second attaching base portion 60, and the inclination angles of the end surface 60a of the second attaching base portion 60 and the end surface 61a of the third attaching base portion 61 are substantially the same. Further, each of the end surface 59a of the first attaching base portion 59, the end surface 60a of the second attaching base portion 60, and the end surface 61a of the third attaching base portion 61 is directed in a different direction.

The lamp housing 52 is provided with heat radiation fins 62, 62, . . . protruding downward from the half portion of the bottom surface portion 56 on the outer side in the left-right direction to be arranged in the front-rear direction.

In the lamp housing 52, a connector (not illustrated) is attached in a penetrated state. The connector has a portion positioned on the outer surface side of the lamp housing 52 and a portion positioned on the inner surface side of the lamp housing 52, and the portion positioned on the outer surface side of lamp housing 52 is connected to a power supply circuit (not illustrated) of the aircraft 100 via a connection cord (not illustrated).

The cover 53 includes a retainer 63 formed in an annular shape by a metal material such as aluminum, and a transmission cover portion 64 with an outer peripheral portion fixed to the retainer 63. In the cover 53, the retainer 63 is coupled to the flange portion 58 of the lamp housing 52 by, for example, screwing via a gasket 65 having substantially the same size and shape as the retainer 63. The gasket 65 is made of, for example, a silicon material, and has a function of securing airtightness between the lamp housing 52 and the cover 53.

The aircraft lamp 51 is arranged in the arrangement recess formed in the horizontal tail wing 200 by fixing the retainer 63 and the flange portion 58 to the horizontal tail wing 200 by, for example, screwing, in a state where the cover 53 is coupled to the flange portion 58.

In the lamp housing 52, a first lamp unit 66, a second lamp unit 67, and a third lamp unit 68 are attached in a state of being arranged in the arrangement space 55. The first lamp unit 66 is attached to the end surface 59a of the first attaching base portion 59, the second lamp unit 67 is attached to the end surface 60a of the second attaching base portion 60, and the third lamp unit 68 is attached to the end surface 61a of the third attaching base portion 61.

Further, the first lamp unit 66, the second lamp unit 67, and the third lamp unit 68 are only different in the configuration of the light source module arranged inside. Therefore, in the following description of the first lamp unit 66, the second lamp unit 67, and the third lamp unit 68, the configuration other than the light source module will be described in detail only with the first lamp unit 66, and in the second lamp unit 67 and the third lamp unit 68, the same reference numerals as those assigned to the same parts in the first lamp unit 66 are assigned, and detailed descriptions thereof will be omitted.

Figure 13:
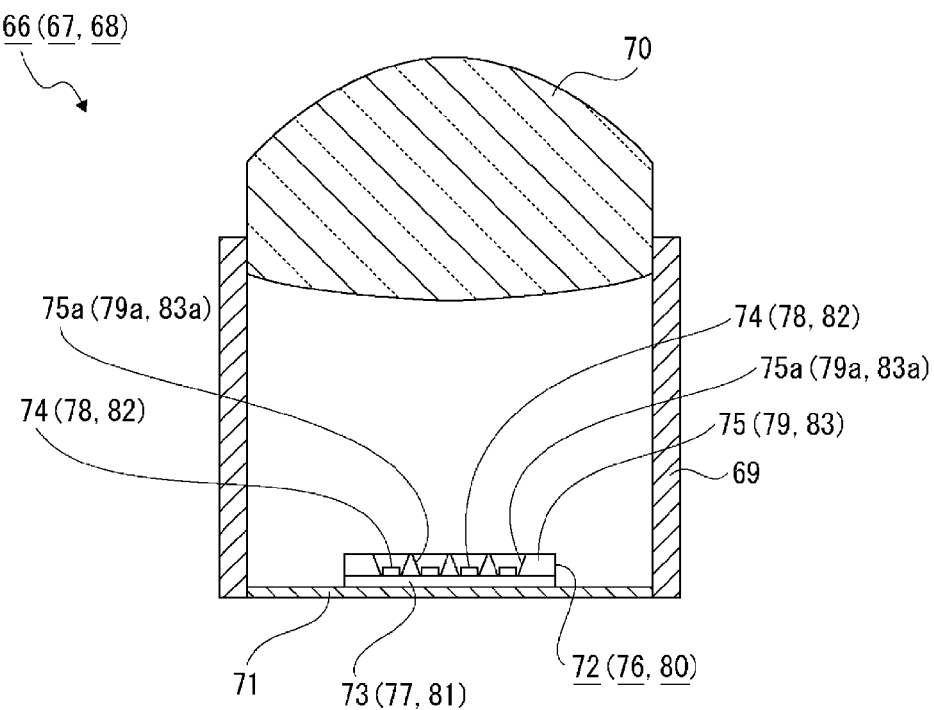
FIG. 13 is a cross-sectional view of a lamp unit.

The first lamp unit 66 includes a lens holder 69 formed in a cylindrical shape, a control lens 70 held at one end portion of the lens holder 69, a base plate 71 attached to the other end portion of the lens holder 69, and a first light source module 72 arranged on the base plate 71 (see FIG. 13).

The control lens 70 is, for example, a convex lens, and has a function of controlling to condense light and irradiating the light toward the irradiated surface 301. The control lens 70 is held in a state where a part of the control lens 70 is fitted to one end portion of the lens holder 69.

The base plate 71 is made of, for example, a metal material having high heat dissipation, and the outer peripheral portion thereof is attached to the other end portion of the lens holder 69. The base plate 71 comes into surface contact with the end surface 59a of the first attaching base portion 59 in a state where the first lamp unit 66 is attached to the first attaching base portion 59. Further, the base plate 71 may be formed integrally with the lens holder 69.

The first light source module 72 includes a first substrate 73 on which a circuit pattern is formed, first semiconductor light emitting elements 74, 74, . . . mounted on the first substrate 73, and a first reflector 75 that reflects light emitted from the first semiconductor light emitting elements 74, 74, . . . . The first light source module 72 is arranged on the surface of the base plate 71 on the control lens 70 side via a heat radiation sheet (not illustrated).

Figure 14:
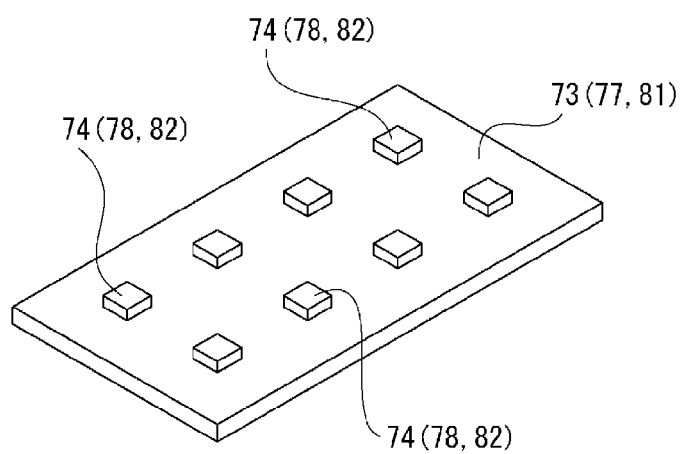
FIG. 14 is a perspective view illustrating an example of an arrangement state of a semiconductor light emitting element.

The first semiconductor light emitting elements 74, 74, . . . are mounted on the first substrate 73 in, for example, a matrix shape at equal intervals (see FIG. 14). The first semiconductor light emitting elements 74, 74, . . . may be controlled to be individually turned ON/OFF. The first reflector 75 is attached to the first substrate 73, and a plurality of reflecting portions 75a, 75a, . . . is integrally formed (see FIG. 13). The reflecting portions 75a, 75a, . . . are provided in the same number as the first semiconductor light emitting elements 74, 74, . . . . The reflecting portion 75a is positioned around the first semiconductor light emitting element 74, and has a function of reflecting the light emitted from the first semiconductor light emitting element 74 toward the control lens 70.

The second lamp unit 67 includes the lens holder 69, the control lens 70, the base plate 71, and a second light source module 76 arranged on the base plate 71.

The base plate 71 comes into surface contact with the end surface 60a of the second attaching base portion 60 in a state where the second lamp unit 67 is attached to the second attaching base portion 60.

The second light source module 76 includes a second substrate 77 on which a circuit pattern is formed, second semiconductor light emitting elements 78, 78, . . . mounted on the second substrate 73, and a second reflector 75 that reflects light emitted from the second semiconductor light emitting elements 78, 78, . . . . The second light source module 76 is arranged on the surface of the base plate 71 on the control lens 70 side via a heat radiation sheet (not illustrated).

Figure 15:
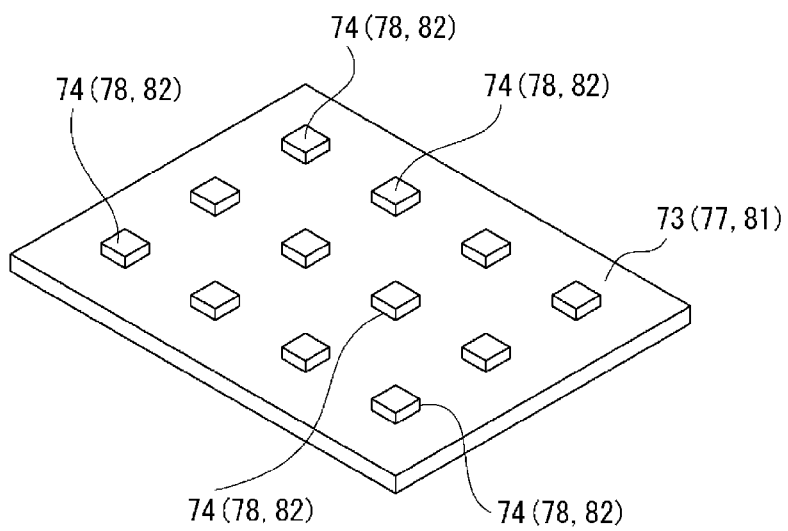
FIG. 15 is a perspective view illustrating another example of an arrangement state of a semiconductor light emitting element.

The second semiconductor light emitting elements 78, 78, . . . are mounted on the second substrate 77 in, for example, a matrix shape at equal intervals (see FIG. 14). The second semiconductor light emitting elements 78, 78, . . . may be controlled to be individually turned ON/OFF. The arrangement state of the second semiconductor light emitting elements 78, 78, . . . with respect to the second substrate 77 may be different from the arrangement state of the first semiconductor light emitting elements 74, 74, . . . with respect to the first substrate 73 in the first light source module 72 (see FIG. 15). Further, FIG. 14 illustrates the arrangement state of the semiconductor light emitting elements made into 4×2 as an example, and FIG. 15 illustrates the arrangement state of the semiconductor light emitting elements made into 3×4, but the arrangement states of the first semiconductor light emitting elements 74, 74, . . . with respect to the first substrate 73 and the second semiconductor light emitting elements 78, 78, . . . with respect to the second substrate 77 are not limited to these examples, and may be arbitrarily determined according to, for example, an irradiation range.

The second reflector 79 is attached to the second substrate 77, and a plurality of reflecting portions 79a, 79a, . . . is integrally formed (see FIG. 13). The reflecting portions 79a, 79a, . . . are provided in the same number as the second semiconductor light emitting elements 78, 78, . . . . The reflecting portion 79a is positioned around the second semiconductor light emitting element 78, and has a function of reflecting the light emitted from the second semiconductor light emitting element 78 toward the control lens 70.

The third lamp unit 68 includes the lens holder 69, the control lens 70, the base plate 71, and a third light source module 80 arranged on the base plate 71.

The base plate 71 comes into surface contact with the end surface 61a of the third attaching base portion 61 in a state where the third lamp unit 68 is attached to the third attaching base portion 61.

The third light source module 80 includes a third substrate 81 on which a circuit pattern is formed, third semiconductor light emitting elements 82, 82, . . . mounted on the third substrate 81, and a third reflector 83 that reflects light emitted from the third semiconductor light emitting elements 82, 82, . . . . The third light source module 80 is arranged on the surface of the base plate 71 on the control lens 70 side via a heat radiation sheet (not illustrated).

The third semiconductor light emitting elements 82, 82, . . . are mounted on the third substrate 81 in, for example, a matrix shape at equal intervals (see FIGS. 14 and 15). The third semiconductor light emitting elements 82, 82, . . . may be controlled to be individually turned ON/OFF. The arrangement state of the third semiconductor light emitting elements 82, 82, . . . with respect to the third substrate 81 may be different from the arrangement state of the first semiconductor light emitting elements 74, 74, . . . with respect to the first substrate 73 in the first light source module 72 or the arrangement state of the second semiconductor light emitting elements 78, 78, . . . with respect to the second substrate 77 in the second light source module 76. The arrangement state of the third semiconductor light emitting elements 82, 82, . . . with respect to the third substrate 81 may be arbitrarily determined according to, for example, an irradiation range, similarly to the arrangement state of the first semiconductor light emitting elements 74, 74, . . . with respect to the first substrate 73 and the arrangement state of the second semiconductor light emitting elements 78, 78, . . . with respect to the second substrate 77.

The third reflector 83 is attached to the third substrate 81, and a plurality of reflecting portions 83a, 83a, . . . is integrally formed (see FIG. 13). The reflecting portions 83a, 83a, . . . are provided in the same number as the third semiconductor light emitting elements 82, 82, . . . . The reflecting portion 83a is positioned around the third semiconductor light emitting element 82, and has a function of reflecting the light emitted from the third semiconductor light emitting element 82 toward the control lens 70.

For example, a light emitting diode (LED) is used as each of the first semiconductor light emitting element 74, the second semiconductor light emitting element 78, and the third semiconductor light emitting element 82.

The heat generated in the first semiconductor light emitting element 74, the second semiconductor light emitting element 78, and the third semiconductor light emitting element 82, and in the first substrate 72, the second substrate 77, and the third substrate 81 is mainly transferred from the heat transfer sheet to the lamp housing 52 via the base plates 71, 71, and 71, and is released from the heat radiation fins 62, 62, . . . to the outside.

As described above, the first lamp unit 66 is arranged on the first attaching base portion 59, the second lamp unit 67 is arranged on the second attaching base portion 60, and the third lamp unit 68 is arranged on the third attaching base portion 61, and each of the end surface 59*a*, the end surface 60*a*, and the end surface 61*a* is directed in a different direction. Therefore, each of an irradiation direction S1 of the light from the first lamp unit 66, an irradiation direction S2 of the light from the second lamp unit 67, and an irradiation direction S3 of the light from the third lamp unit 68 is directed in a different direction (see FIGS. 11 and 12). Further, the irradiation direction S1 of the light from the first lamp unit 66 is directed upward from the irradiation direction S2 of the light from the second lamp unit 67 and the irradiation direction S3 of the light from the third lamp unit 68, and the irradiation direction S2 of the light from the second lamp unit 67 and the irradiation direction S3 of the light from the third lamp unit 68 are directed in a substantially same direction in the vertical direction. Further, the irradiation direction S2 of the light from the second lamp unit 67, and the irradiation direction S3 of the light from the third lamp unit 68 are directed in a different direction in the left-right direction.

Further, the first lamp unit 66 is positioned to be lower than the second lamp unit 67 and the third lamp unit 68, and thus, the second lamp unit 67 and the third lamp unit 68 are positioned closer to the cover 53 than the first lamp unit 66 (see FIG. 12).

Further, in the aircraft lamp 51, each of the first lamp unit 66, the second lamp unit 67, and the third lamp unit 68 may be arranged at different positions in the vertical direction.

Further, in the above, the example in which each of the irradiation directions S1, S2, and S3 of the light from the first lamp unit 66, the second lamp unit 67, and the third lamp unit 68 is directed in a different direction has been described, but the irradiation directions of the light from any two lamp units of the first lamp unit 66, the second lamp unit 67, and the third lamp unit 68 may be directed in a different direction.

The first lamp unit 66 is arranged at the position closer to the vertical tail wing 300 than the second lamp unit 67 and the third lamp unit 68 in the left-right direction, and the second lamp unit 67 and the third lamp unit 68 are arranged, for example, at the positions having the same distance from the vertical tail wing 300 in the left-right direction. The first lamp unit 66 is set to a near lamp unit arranged at a position close to the vertical tail wing 300, and the second lamp unit 67 and the third lamp unit 68 are set to distant lamp units arranged at positions far from the vertical tail wing 300.

A substrate case 84 made of, for example, a metal material such as aluminum is attached to the bottom surface portion 56 of the lamp housing 52 (see FIGS. 11 and 12). The substrate case 84 is formed in a box shape opened upward, and the upper end surface is attached to the lower surface of the bottom surface portion 56 and is positioned on the side of the heat radiation fins 62, 62, . . . of the lamp housing 52. The lower end portion of the substrate case 84 is provided as heat radiation fin portions 84*a*, 84*a*, . . . arranged in the front-rear direction.

A control substrate 85 is arranged inside the substrate case 84. The control substrate 85 has a function of controlling the ON/OFF of the first semiconductor light emitting elements 74, 74, . . . of the first lamp unit 66, the ON/OFF of the second semiconductor light emitting elements 78, 78, . . . of the second lamp unit 67, and the ON/OFF of the third semiconductor light emitting elements 82, 82, . . . of the third lamp unit 68. The control substrate 85 is attached to the bottom plate portion of the substrate case 84 via spacers 86, 86, . . . . Electronic parts (not illustrated) are mounted on both sides of the control substrate 85, respectively.

The heat generated in the control substrate 85 is mainly released from the fin portions 84*a*, 84*a*, . . . to the outside.

As described above, in the state where the first lamp unit 66, the second lamp unit 67, the third lamp unit 68, and the control substrate 85 are attached to the lamp housing 52, the first substrate 73 of the first lamp unit 66, the second substrate 77 of the second lamp unit 67, and the third substrate 81 of the third lamp unit 68 are connected to the control substrate 85 by a connection cord (not illustrated), and the control substrate 85 is connected to a connector.

Therefore, power is supplied from the power supply circuit via the connector and the control substrate 85 to the first semiconductor light emitting elements 74, 74, . . . , the second semiconductor light emitting elements 78, 78, . . . , or the third semiconductor light emitting elements 82, 82, . . . via first substrate 73, the second substrate 77, or the third substrate 81.

In the aircraft lamp 51, power is supplied, for example, simultaneously from the power supply circuit to the first semiconductor light emitting elements 74, 74, . . . , the second semiconductor light emitting elements 78, 78, . . . , and the third semiconductor light emitting elements 82, 82, . . . .

Figure 16:
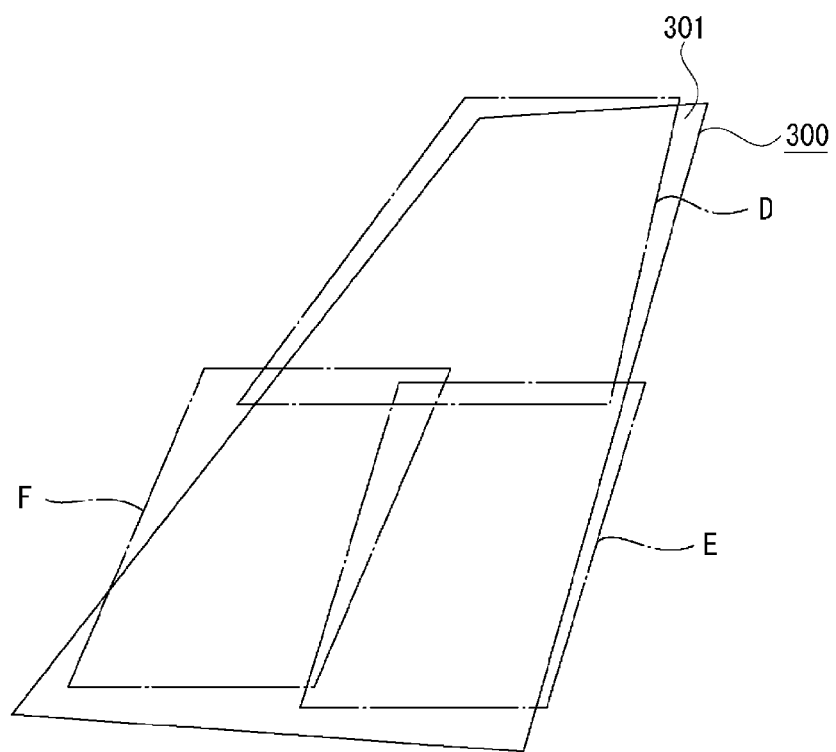
FIG. 16 is a conceptual view illustrating an irradiation state of light on a vertical tail wing.

When the power is supplied to the first semiconductor light emitting elements 74, 74, . . . , light is emitted from the first semiconductor light emitting elements 74, 74, . . . , and the emitted light is reflected by the reflecting portions 75*a*, 75*a*, . . . of the first reflector 75, respectively, and controlled by the control lens 70, and is irradiated to an upper end side area D of the irradiated surface 301 of the vertical tail wing 300 (see FIG. 16). Therefore, the area D, which is an upper side area of the vertical tail wing 300 is irradiated with the light irradiated from the first lamp unit 66 provided as the near lamp unit.

Further, when the power is supplied to the second semiconductor light emitting elements 78, 78, . . . , light is emitted from the second semiconductor light emitting elements 78, 78, . . . , and the emitted light is reflected by the reflecting portions 79*a*, 79*a*, . . . of the second reflector 79, respectively, and controlled by the control lens 70, and is irradiated to a lower end side area E of the irradiated surface 301 of the vertical tail wing 300. Therefore, the area E, which is a lower side area of the vertical tail wing 300 is irradiated with the light irradiated from the second lamp unit 67 provided as the distant lamp unit.

Further, when the power is supplied to the third semiconductor light emitting elements 82, 82, . . . , light is emitted from the third semiconductor light emitting elements 82, 82, . . . , and the emitted light is reflected by the reflecting portions 83*a*, 83*a*, . . . of the third reflector 83, respectively, and controlled by the control lens 70, and is irradiated to a lower end side area F of the irradiated surface 301 of the vertical tail wing 300. The area F is, for example, an area on the front side of the area E. Therefore, the area F, which is a lower side area of the vertical tail wing 300 is irradiated with the light irradiated from the third lamp unit 68 provided as the distant lamp unit.

Further, light is irradiated obliquely forward from the second lamp unit 67, and light is irradiated obliquely backward from the third lamp unit 68, and thus, light is irradiated from the second lamp unit 67 and the third lamp unit 68 provided as the distant lamp unit in a state where the light intersects with each other.

As described above, in the aircraft lamp 51, the light controlled by the control lens 70 of the first lamp unit 66 is irradiated to the upper end side area D of the irradiated surface 301 of the vertical tail wing 300, the light controlled by the control lens 70 of the second lamp unit 67 is irradiated to the lower end side area E of the irradiated surface 301 of the vertical tail wing 300, and the light controlled by the control lens 70 of the third lamp unit 68 is irradiated to the lower end side area F of the irradiated surface 301 of the vertical tail wing 300. Therefore, the irradiated surface 301 of the vertical tail wing 300 on which a logo is drawn is entirely illuminated by the light emitted from the first semiconductor light emitting elements 74, 74, . . . , the second semiconductor light emitting elements 78, 78, . . . , and the third semiconductor light emitting elements 82, 82, . . . .

However, an airframe of an aircraft is often larger than a vehicle such as an automobile, and it is desired that efficient lighting is performed according to an area where lighting is required. Further, it is also desired for the structure that performs such efficient lighting to have a simple structure and to reduce the size.

However, in the structure in which a plurality of lamp units is arranged vertically and horizontally as described in Patent Document 1, it is possible to illuminate a wide area, but it is necessary to increase or decrease the number of the lamp units depending on the size and position of the area to be illuminated, which makes the efficient lighting difficult to be performed.

In particular, in an aircraft lamp such as a logo lamp configured to illuminate an area that is changed depending on the size and position of the logo of the airline, there is a possibility of illuminating unnecessary areas, and it becomes impossible to secure an efficient lighting state.

Further, in the structure in which a plurality of lamp unit is arranged vertically and horizontally, it becomes difficult to reduce the size and simplify the structure.

Therefore, as disclosed above, in the aircraft lamp 51, the first lamp unit 66, the second lamp unit 67, and the third lamp unit 68 are provided with a plurality of first semiconductor light emitting elements 74, a plurality of second semiconductor light emitting elements 78, and a plurality of third semiconductor light emitting elements 82, respectively, and the control lenses 70, 70, and 70 that controls light, so that the first semiconductor light emitting elements 74, 74, . . . , the second semiconductor light emitting elements 78, 78, . . . , and the third semiconductor light emitting elements 82, 82, . . . in the first lamp unit 66, the second lamp unit 67, and the third lamp unit 68 are controllable to be individually turned ON/OFF.

Therefore, since each lamp unit is provided with a plurality of semiconductor light emitting elements, and the ON/OFF of the plurality of semiconductor light emitting elements is individually performed, it is possible to perform efficient lighting while securing simplification and miniaturization of the structure.

In particular, in a case such as a logo lamp where an area to be illuminated is changed depending on the size and position of the logo of the airline, it is possible to illuminate only the part that requires lighting by controlling the ON/OFF of each semiconductor light emitting element, and unnecessary areas are not illuminated. Therefore, it is possible to secure an efficient lighting state according to the area to be illuminated.

Further, the upper side area D of the vertical tail wing is illuminated by the light irradiated from the first lamp unit 66 provided as the near lamp unit, and the lower side areas E and F of the vertical tail wing are illuminated by the light irradiated from the second lamp unit 67 and the third lamp unit 68 provided as the distant lamp unit.

Therefore, the light irradiated toward the lower side areas E and F is less likely to be shielded by the lamp housing 52, and the lower side areas E and F of the irradiated surface 301 may be efficiently irradiated.

Further, since the light from the second lamp unit 67 and the third lamp unit 68 provided as the distant lamp unit, respectively, is irradiated in a state where the light intersects with each other, the irradiated light is less likely to be shielded by the lamp housing 52, and the degree of freedom in the illumination direction is increased. Therefore, it is possible to efficiently and brightly illuminate the area to be illuminated.

Further, in the aircraft lamp 51, irradiation directions of light from at least two lamp units of the first lamp unit 66, the second lamp unit 67, and the third lamp unit 68 are set to be different from each other.

Therefore, since at least two lamp units of the first lamp unit 66, the second lamp unit 67, and the third lamp unit 68 arranged in the arrangement space 55 irradiate light in different directions, it is possible to irradiate light in a different direction from each lamp unit, and it is possible to efficiently illuminate a wide area while securing simplification of the structure.

Further, the arrangement states of at least two semiconductor light emitting elements of the first semiconductor light emitting elements 74, 74, . . . , the second semiconductor light emitting elements 78, 78, . . . , and the third semiconductor light emitting elements 82, 82, . . . are different from each other.

Therefore, it is possible to change the irradiation area or the irradiation range of light for each lamp unit having a different arrangement state of the semiconductor light emitting elements, and it is possible to efficiently irradiate the required irradiation range.

Further, the first semiconductor light emitting element 74, the second semiconductor light emitting element 78, and the third semiconductor light emitting element 82 are provided with the first reflector 75, the second reflector 79, and the third reflector 83, respectively, having a plurality of reflecting portions 75a, 79a, and 83a that individually reflects the light emitted from the first semiconductor light emitting element 74, the second semiconductor light emitting element 78, and the third semiconductor light emitting element 82 toward the control lenses 70, 70, and 70, respectively.

Therefore, since light is reflected at each of the reflecting portions 75a, 79a, and 83a toward the control lenses 70, 70, and 70, the light emitted from the first semiconductor light emitting element 74, the second semiconductor light emitting element 78, and the third semiconductor light emitting element 82 is easily incident on the control lenses 70, 70, and 70, and thus, the utilization efficiency of light may be improved.

Further, since the utilization efficiency of light may be improved, the number of the first semiconductor light emitting elements 74, the second semiconductor light emitting elements 78, and the third semiconductor light emitting elements 82 required to secure a necessary illuminance may be reduced. Therefore, it is possible to reduce the size of the aircraft lamp 51 and to reduce the number of parts by reducing the number of the first semiconductor light emitting elements 74, the second semiconductor light emitting elements 78, and the third semiconductor light emitting elements 82.

Further, in the first lamp unit 66, the second lamp unit 67, and the third lamp unit 68, the positions of at least two lamp units are different from each other in the vertical direction which is the attaching direction of the cover 53 with respect to the lamp housing 52.

Therefore, light is irradiated from the lamp units arranged at different positions in the attaching direction of the cover 53 with respect to the lamp housing 52, respectively. Therefore, it is possible to easily change the irradiation area of the light irradiated from each lamp unit, and thus, the efficient lighting may be performed with respect to the required irradiation area.

In particular, since the second lamp unit 67 and the third lamp unit 68 that irradiate light toward the lower side areas E and F are positioned closer to the cover 53 than the first lamp unit 66 that irradiates light toward the upper side area D, the light irradiated toward the lower side areas E and F is less likely to be shielded by the lamp housing 52, and the lower side areas E and F of the irradiated surface 301 may be efficiently irradiated.

Further, in the above, the example in which three lamp units of the first lamp unit 66, the second lamp unit 67, and the third lamp unit 68 are provided has been described, but the number of the lamp units provided in the aircraft lamp 51 is not limited to three, and any plural number is used.

DESCRIPTION OF SYMBOLS

1: aircraft lamp
2: lamp housing
3: cover
4: lamp outer housing
5: arrangement space
9: unit accommodation portion
9a: insertion/removal port
19: first light source unit
20: second light source unit
21: substrate
22: first light source
23: first inner lens
26: first control lens portion
28: substrate
29: second light source
30: second inner lens
33: second control lens portion
33a: first direction control portion
33b: second direction control portion
35: control unit
37: first control substrate
38: second control substrate
39: shielding plate
40: attaching plate
42: electronic part
45: electronic part
46: heat transfer sheet
51: aircraft lamp
52: lamp housing
53: cover
54: lamp outer housing
55: arrangement space
66: first lamp unit
67: second lamp unit
68: third lamp unit
70: control lens
72: first light source module
73: first substrate
74: first semiconductor light emitting element
75: first reflector
75a: reflecting portion
76: second light source module
77: second substrate
78: second semiconductor light emitting element
79: second reflector
79a: reflecting portion
80: third light source module
81: third substrate
82: third semiconductor light emitting element
83: third reflector
83a: reflecting portion
301: irradiated surface

What is claimed is:

1. An aircraft lamp comprising:
   a lamp outer housing configured by a lamp housing having an opening and a cover attached to the lamp housing in a state where the opening is closed, an internal space being formed in the lamp outer housing as an arrangement space;
   a light source unit including a light source and arranged in the arrangement space; and
   a controller including a control substrate that controls an ON/OFF of the light source, and a shielding plate that shields noise generated in the control substrate,
   wherein the lamp housing is provided with a unit accommodation portion having a concave shape and an insertion/removal port,
   the control substrate is configured to be accommodated in and removed from the unit accommodation portion via the insertion/removal port, and
   at least a part of the insertion/removal port is closed by the shielding plate in a state where the control substrate is accommodated in the unit accommodation portion,
   wherein a first light source unit and a second light source unit are provided as the light source unit,
   a first control substrate that controls the light source of the first light source unit and a second control substrate that controls the light source of the second light source unit are provided as the control substrate, and
   the first control substrate and the second control substrate are each configured to be accommodated in and removed from the unit accommodation portion via the insertion/removal port.

2. The aircraft lamp according to claim 1, wherein the controller is provided with an attaching plate that is configured to be accommodated in the unit accommodation portion and orthogonal to the shielding plate, and
   the first control substrate and the second control substrate are attached to both surfaces of the attaching plate.

3. The aircraft lamp according to claim 2, wherein the lamp housing further includes a pair of guide grooves configured to guide both end portions of the attaching plate when the first control substrate and the second control substrate are accommodated in the unit accommodation portion.

4. The aircraft lamp according to claim 2, wherein the attaching plate is made of a heat-dissipating material,
the first control substrate and the second control substrate are each provided with an electronic component that generates heat during a period of driving, and
a heat transfer sheet is interposed between the electronic component and the attaching plate.

5. The aircraft lamp of claim 1,
wherein the first light source body unit has a first inner lens and a plurality of first light sources; and
wherein the second light source unit has a second inner lens and a plurality of second light sources;
wherein an irradiation direction of light from the first light source unit and an irradiation direction of light from the second light source unit are set to be different from each other,
the first inner lens is provided with a plurality of first control lens portions that controls the light emitted from the plurality of first light sources, respectively,
the second inner lens is provided with a plurality of second control lens portions that controls the light emitted from the plurality of second light sources, respectively,
each of the plurality of second control lens portions is provided as a first direction control portion or a second direction control portion, and
an irradiation direction of light emitted from the second light source and controlled by the first direction control portion and an irradiation direction of light emitted from the second light source and controlled by the second direction control portion are set to be different from each other.

6. The aircraft lamp according to claim 5, wherein a refraction angle of light in the first direction control portion is different from a refraction angle of the light in the second direction control portion.

7. The aircraft lamp according to claim 6, wherein the refraction angle of the second direction control portion is set to be larger than the refraction angle of the first direction control portion, and
the second direction control portion is positioned closer to the cover than at least one of the first direction control portions.

8. The aircraft lamp according to claim 5, wherein each of the first inner lens and the second inner lens is configured to be detachable with respect to the lamp housing.

9. The aircraft lamp according to claim 5, wherein the first light source unit is provided with a substrate on which the first light source is mounted,
the second light source unit is provided with a substrate on which the second light source is mounted, and
the substrate of the first light source body unit is same as the substrate of the second light source body unit.

10. The aircraft lamp of claim 1,
wherein the light source unit is provided with a plurality of semiconductor light emitting elements that functions as light sources, and a control lens that controls light emitted from the semiconductor light emitting elements, and
the plurality of semiconductor light emitting elements of each are controllable to be individually turned ON/OFF.

11. The aircraft lamp according to claim 10, wherein a vertical tail wing is illuminated by light irradiated from the plurality of lamp units,
the first light source unit and the second light source unit are arranged at different positions in a left-right direction,
wherein the first light source unit is arranged at a position closer to the vertical tail wing as a near lamp unit so as to illuminate an upper side area of the vertical tail wing, and the second light source unit is arranged at a position farther from the vertical tail wing as a distant lamp unit, so as to illuminate a lower side area of the vertical tail wing.

12. The aircraft lamp according to claim 11, wherein two distant lamp units are arranged, and light from the two distant lamp units is irradiated to intersect with each other.

13. The aircraft lamp according to claim 11, wherein the distant lamp unit is arranged closer to the cover than the near lamp unit in an attaching direction of the cover with respect to the lamp housing.

14. The aircraft lamp according to claim 10, wherein irradiation directions of light from the first light source unit and the second light source unit are different from each other.

15. The aircraft lamp according to claim 10, wherein the semiconductor light emitting elements of the first light source unit are arranged onto a first substrate into a first arrangement state, and the semiconductor light emitting elements of the second light source unit are arranged onto a second substrate into a second arrangement state that is different from the first arrangement state.

16. The aircraft lamp according to claim 15, wherein each of the first light source unit and the second light source unit is provided with a reflector including a plurality of reflecting portions that individually reflects light respectively emitted from the plurality of semiconductor light emitting elements toward the control lens.

* * * * *